United States Patent
Uchiyama et al.

(10) Patent No.: US 10,572,736 B2
(45) Date of Patent: Feb. 25, 2020

(54) IMAGE PROCESSING APPARATUS, IMAGE PROCESSING SYSTEM, METHOD FOR IMAGE PROCESSING, AND COMPUTER PROGRAM

(71) Applicant: CANON KABUSHIKI KAISHA, Tokyo (JP)

(72) Inventors: Hiroyuki Uchiyama, Kawasaki (JP); Ichiro Umeda, Tokyo (JP); Muling Guo, Kawasaki (JP); Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/559,003

(22) PCT Filed: Mar. 14, 2016

(86) PCT No.: PCT/JP2016/001416
§ 371 (c)(1),
(2) Date: Sep. 15, 2017

(87) PCT Pub. No.: WO2016/147644
PCT Pub. Date: Sep. 22, 2016

(65) Prior Publication Data
US 2018/0101732 A1 Apr. 12, 2018

(30) Foreign Application Priority Data
Mar. 16, 2015 (JP) ................. 2015-052701

(51) Int. Cl.
*G06K 9/00* (2006.01)
*G06T 7/292* (2017.01)
(52) U.S. Cl.
CPC .......... *G06K 9/00771* (2013.01); *G06T 7/292* (2017.01); *G06T 2207/10016* (2013.01);
(Continued)

(58) Field of Classification Search
CPC ....... G06K 9/00771; G06K 2009/2045; G06K 2209/21; G06T 7/292; G06T 7/97; G06T 2207/30232; G08B 13/19602
See application file for complete search history.

(56) References Cited

U.S. PATENT DOCUMENTS

| 2003/0179294 A1 | 9/2003 | Martins .................... 348/157 |
| 2007/0229238 A1 | 10/2007 | Boyles et al. .............. 340/435 |

(Continued)

FOREIGN PATENT DOCUMENTS

| CN | 1777281 A | 5/2006 | .............. H04N 7/18 |
| CN | 101268478 A | 9/2008 | |

(Continued)

OTHER PUBLICATIONS

Machine translation of JP 2006-245795 A (published in Japanese Sep. 2006).*

(Continued)

*Primary Examiner* — Andrew W Johns
(74) *Attorney, Agent, or Firm* — Canon U.S.A., Inc. IP Division

(57) ABSTRACT

An image processing apparatus includes an acquiring unit configured to acquire multiple tracking results about an object tracked in multiple video images captured by multiple imaging units. The tracking results correspond one-to-one to the video images. Each of the tracking results contains a position of the object detected from an image frame of the corresponding video image and a tracking label that identifies the object in the video image. The apparatus further includes a relating unit configured to relate objects, detected from image frames of the video images, based on the tracking results acquired by the acquiring unit to obtain relations and an object label generating unit configured to generate an object label based on the relations obtained by (Continued)

the relating unit. The object label uniquely identifies the object across the video images.

26 Claims, 17 Drawing Sheets

(52) U.S. Cl.
CPC ............... *G06T 2207/30196* (2013.01); *G06T 2207/30232* (2013.01)

(56) References Cited

U.S. PATENT DOCUMENTS

| | | | |
|---|---|---|---|
| 2010/0245567 | A1 | 9/2010 | Krahnstoever et al. ...... 348/143 |
| 2011/0018995 | A1 | 1/2011 | Hazzani et al. ............. 348/143 |
| 2013/0136298 | A1 | 5/2013 | Yu et al. ....................... 382/103 |
| 2014/0300746 | A1 | 10/2014 | Adachi ................... G06T 7/004 |
| 2016/0119607 | A1* | 4/2016 | Konno ....................... G06T 3/00 348/47 |

FOREIGN PATENT DOCUMENTS

| | | | | |
|---|---|---|---|---|
| CN | 103004188 | A | 3/2013 | ............. H04N 7/18 |
| EP | 1596334 | A1 | 11/2005 | |
| JP | 6-119564 | A | 4/1994 | |
| JP | 7-049952 | A | 2/1995 | |
| JP | 2006146378 | A | 6/2006 | |
| JP | 2006245795 | A | 9/2006 | |
| JP | 2010063001 | A | 3/2010 | |
| JP | 2013206140 | A | 10/2013 | |
| JP | 2013242728 | A | 12/2013 | |
| WO | 2014050432 | A1 | 4/2014 | |
| WO | 2014162554 | A1 | 10/2014 | |
| WO | 2014/021004 | A1 | 7/2016 | |

OTHER PUBLICATIONS

Machine translation of JP 2006-146378 A (published in Japanese Jun. 2006).*

Zhengyou Zhang, "A Flexible New Technique for Camera Calibration", IEEE Transactions on Pattern Analysis and Machine Intelligence, 22(11): 1330-1334, 2000.

Pierre Moulon, Pascal Monasse, and Renaud Marlet, "Adaptive Structure from Motion with a Contrario Model Estimation", ACCV, 2012.

M. D. Breitenstein et al., "Robust Tracking-by-Detection using a Detector Confidence Particle Filter", ICCV, 2009.

* cited by examiner

[Fig. 1]
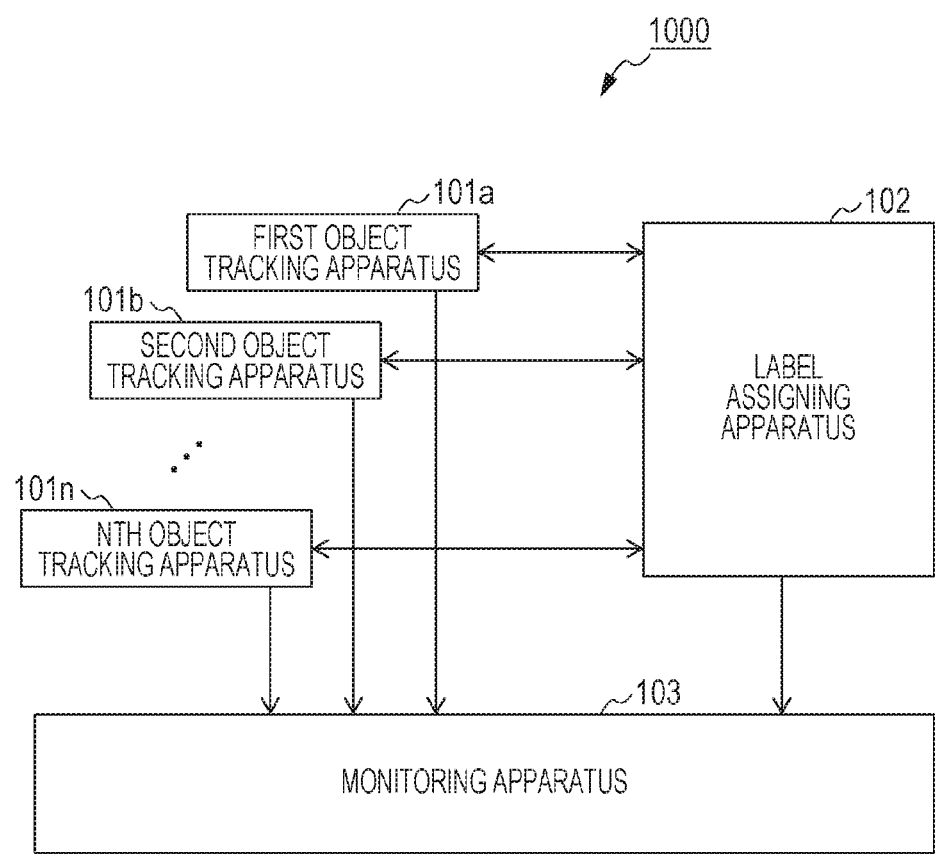

[Fig. 2]
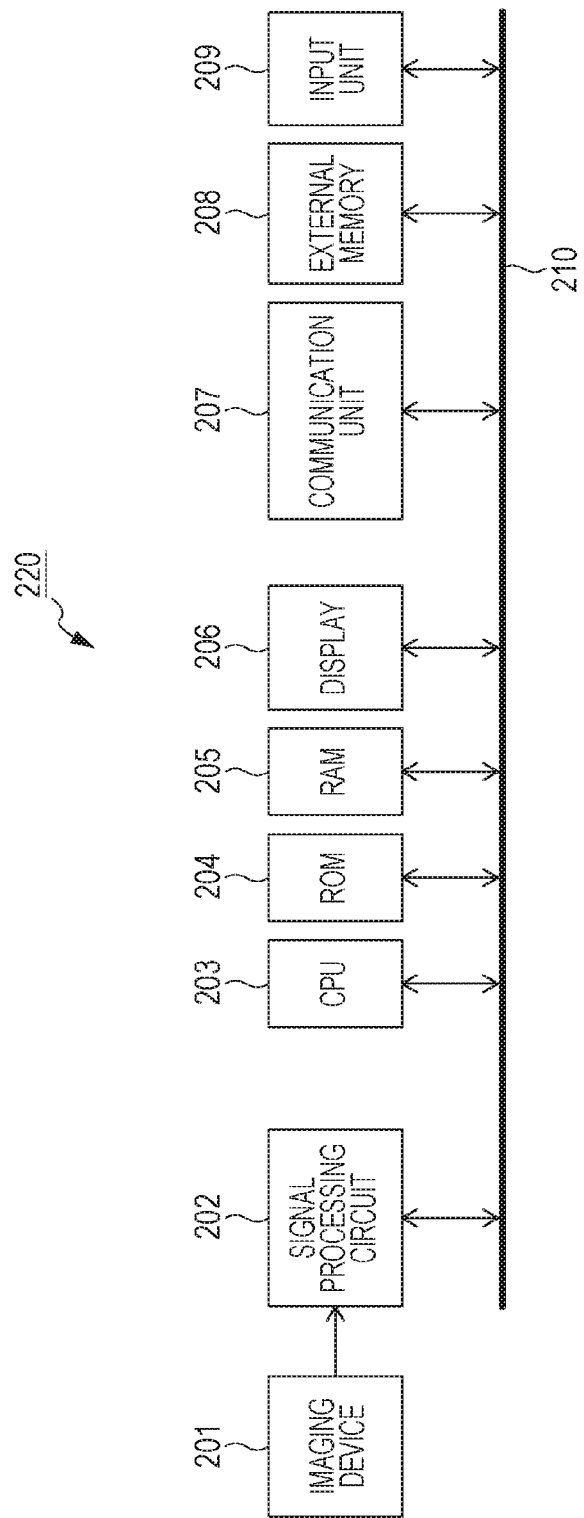

[Fig. 3]
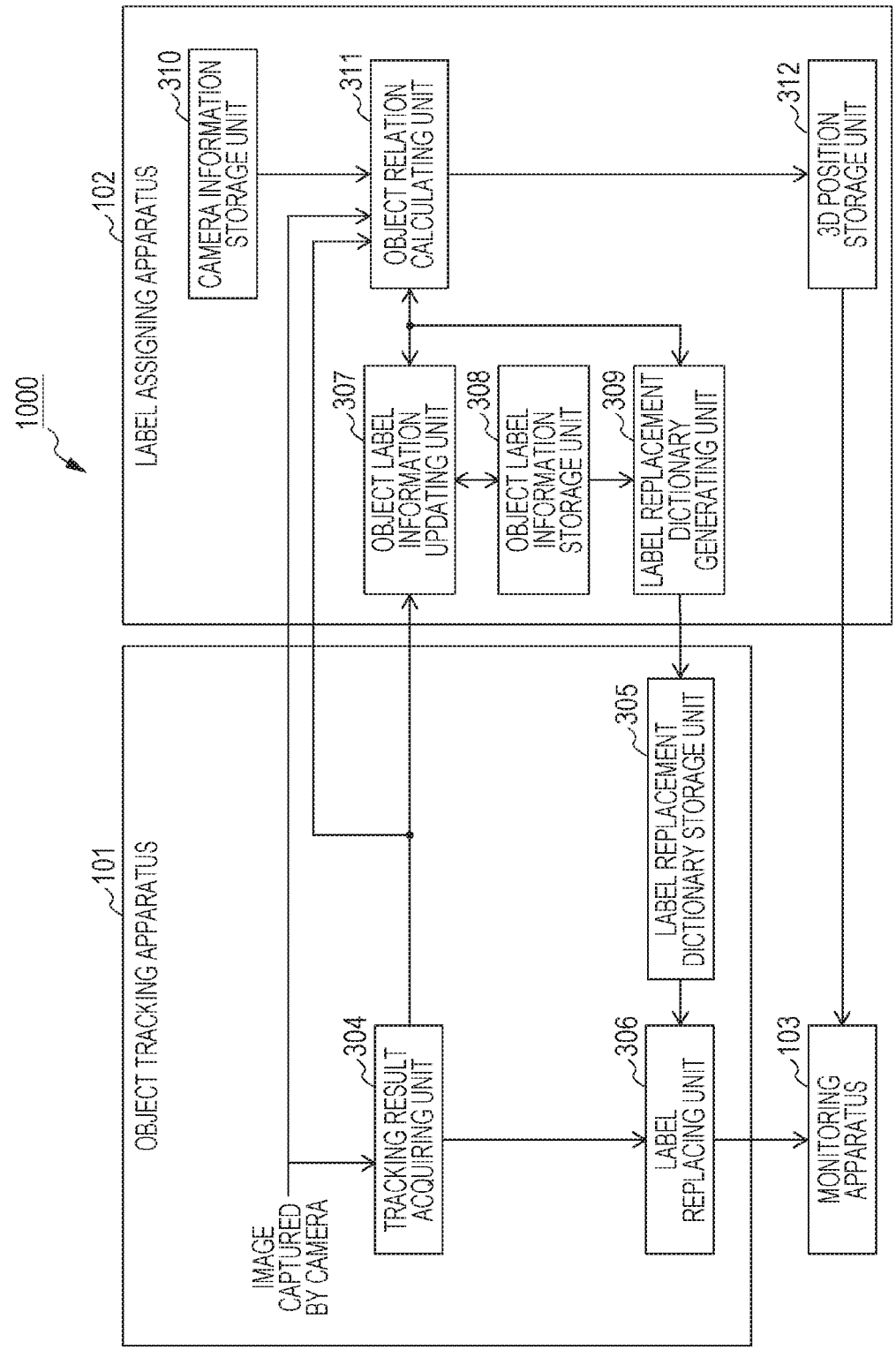

[Fig. 4]
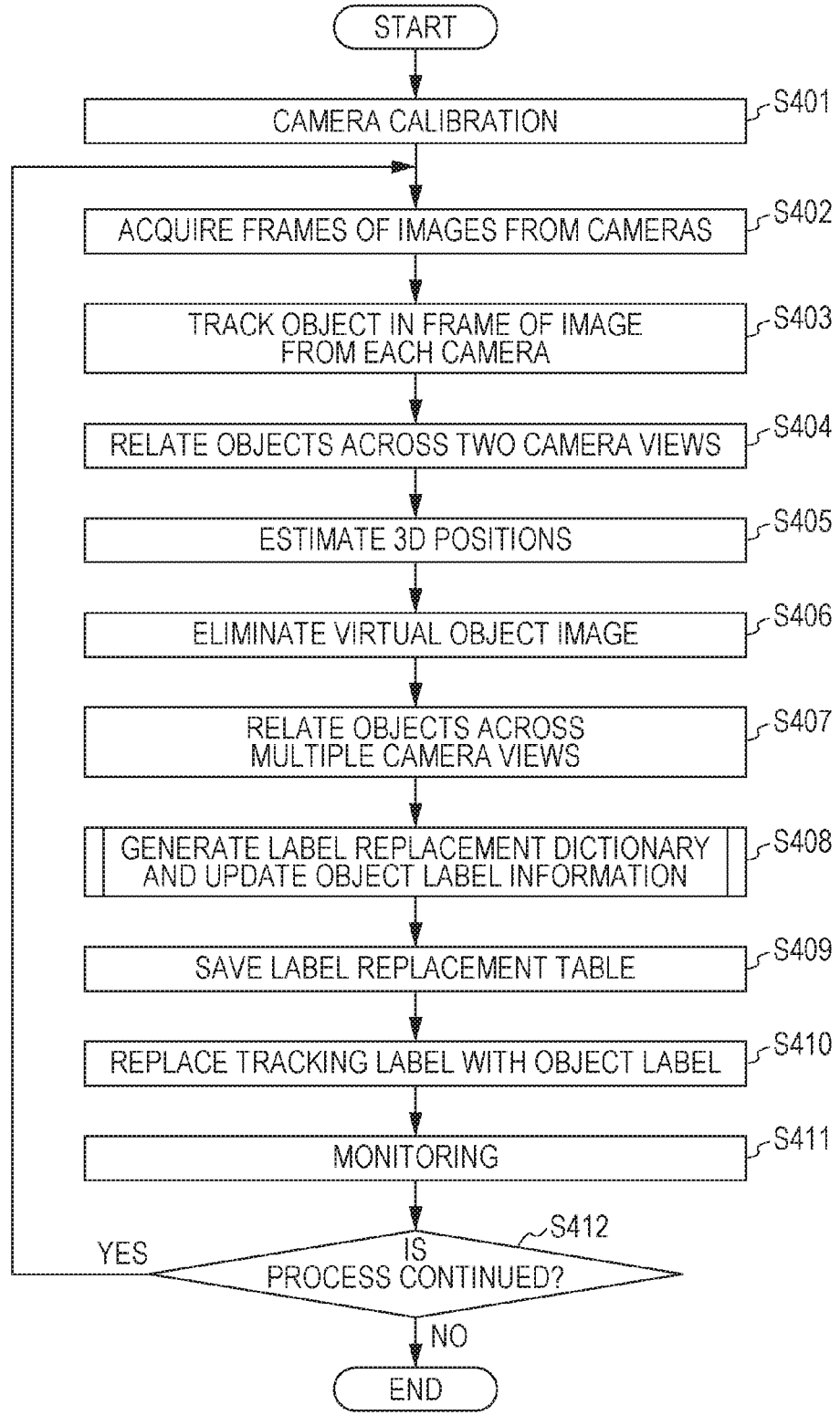

[Fig. 5A]
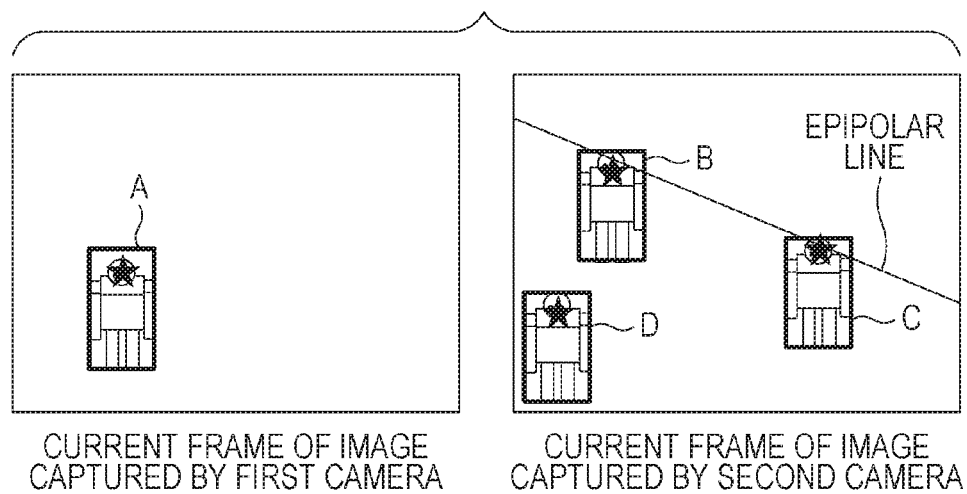
[Fig. 5B]
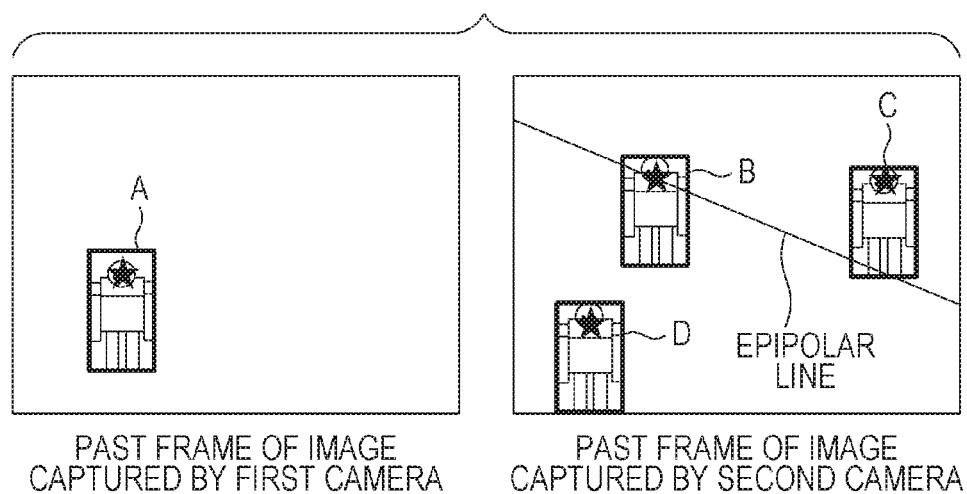

[Fig. 6]
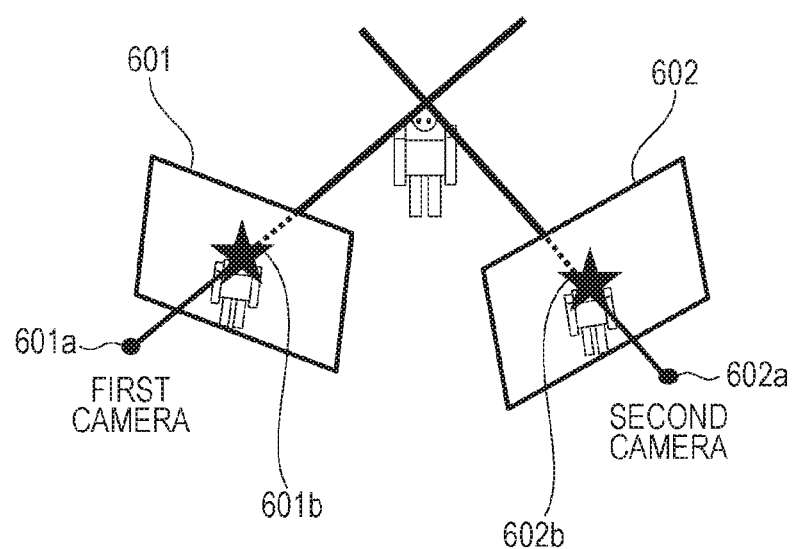

[Fig. 7]
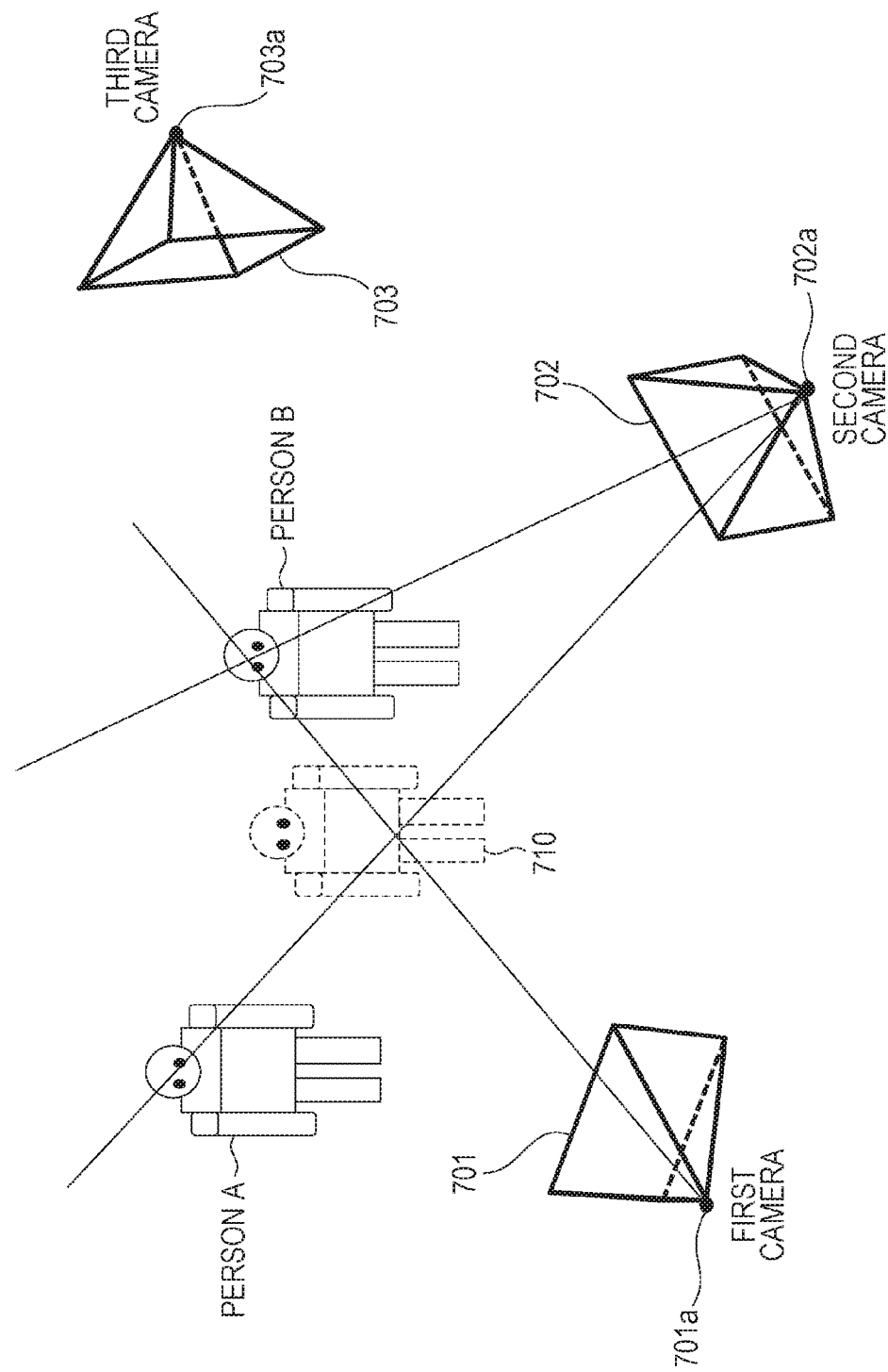

[Fig. 8]
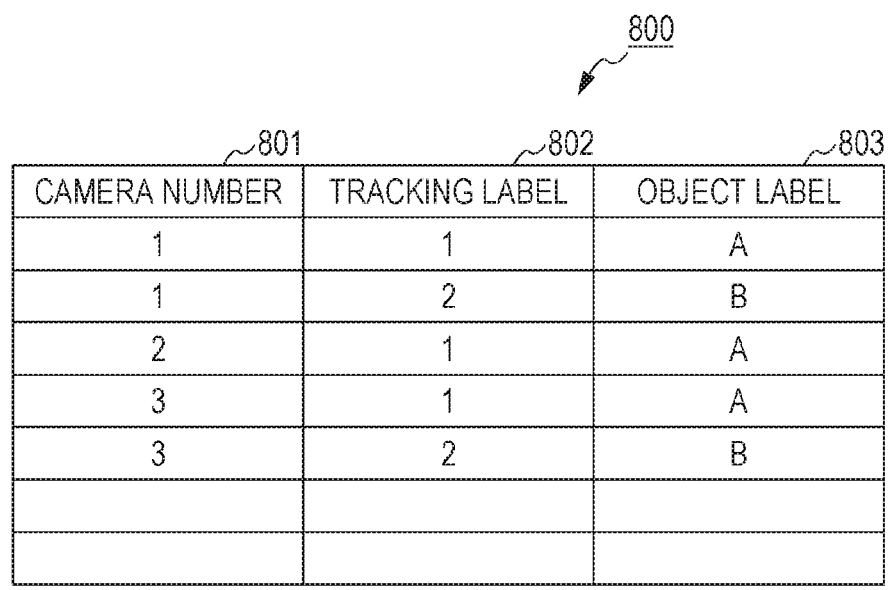

[Fig. 9]
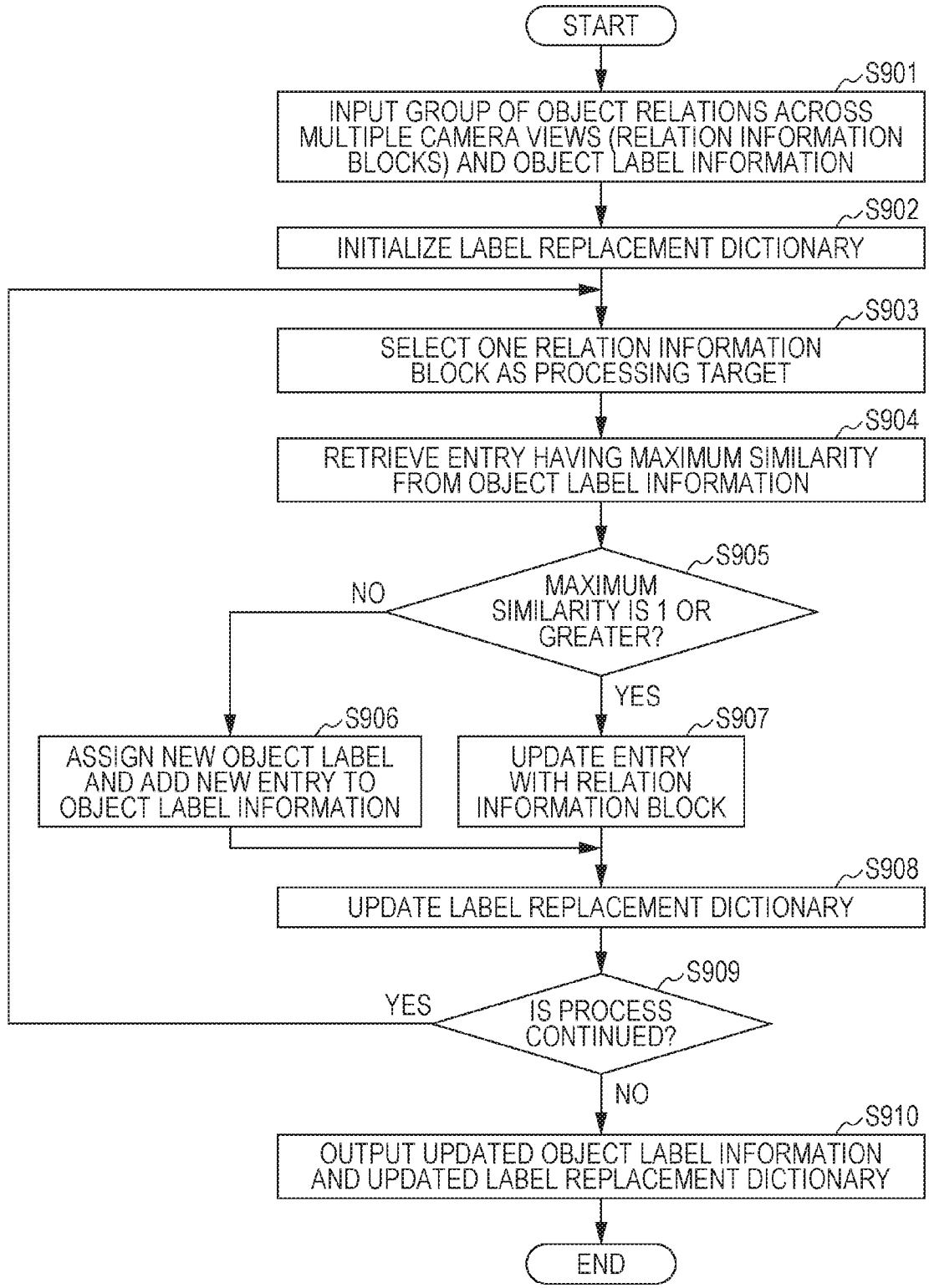

[Fig. 10]

| TRACKING LABEL FOR FIRST CAMERA | TRACKING LABEL FOR SECOND CAMERA | TRACKING LABEL FOR THIRD CAMERA | OBJECT LABEL |
|---|---|---|---|
| 1 | 1 | 2 | A |
| 2 | X | 5 | B |
| 3 | 2 | 1 | C |
| ... | ... | ... | ... |

[Fig. 11]
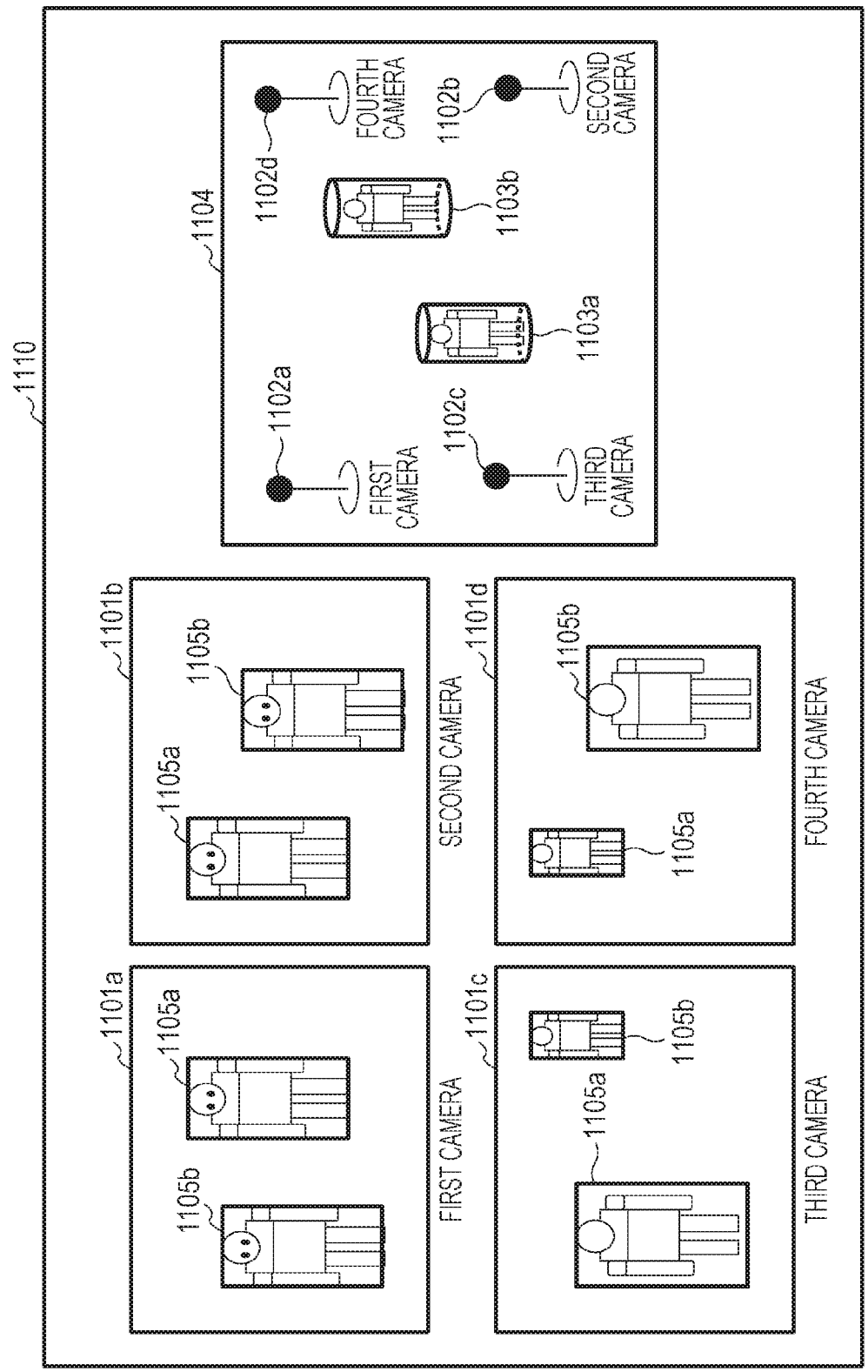

[Fig. 12]
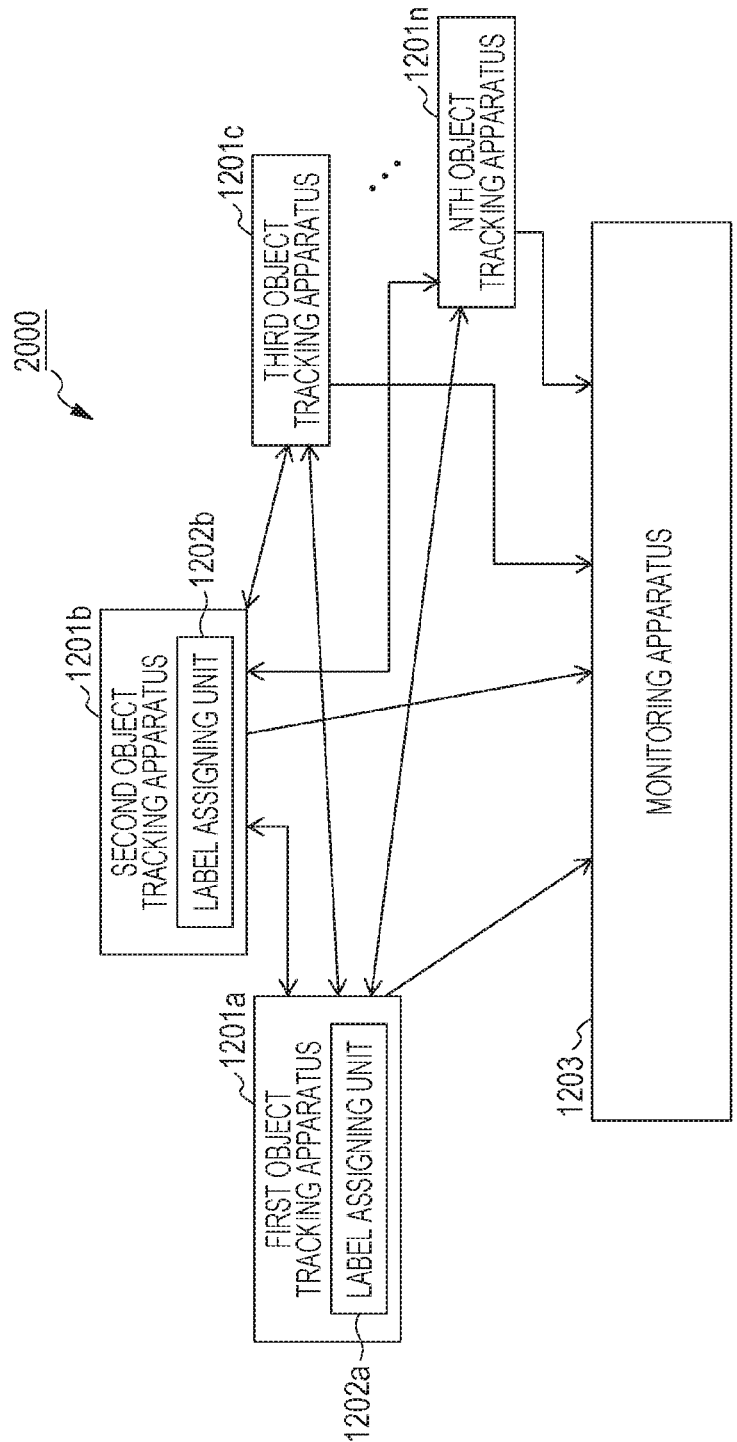

[Fig. 13]
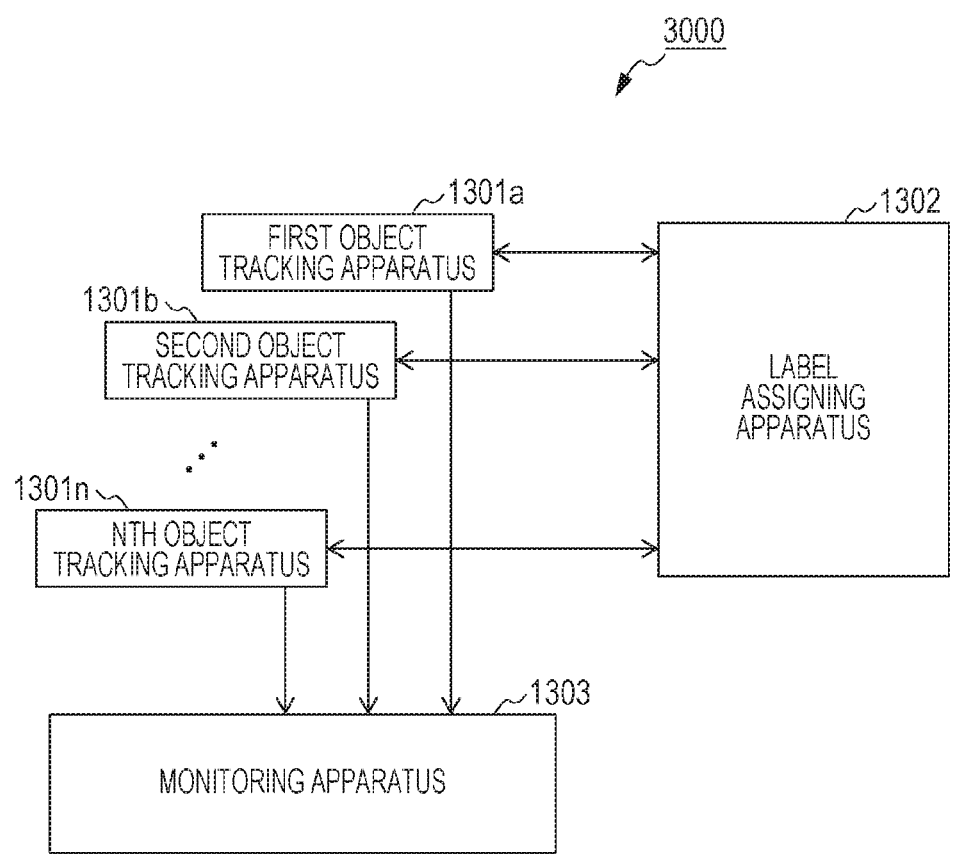

[Fig. 14]
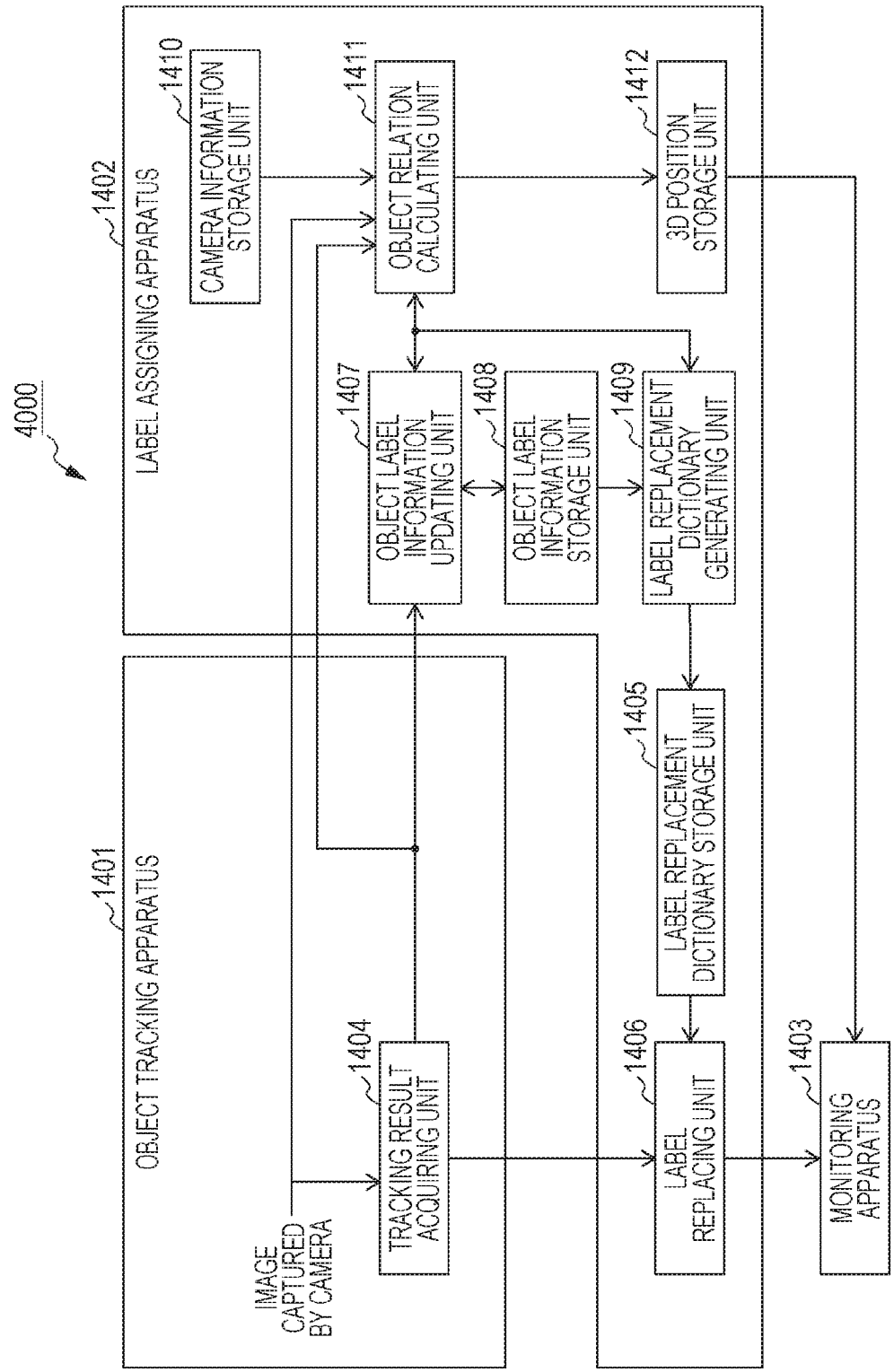

[Fig. 15]
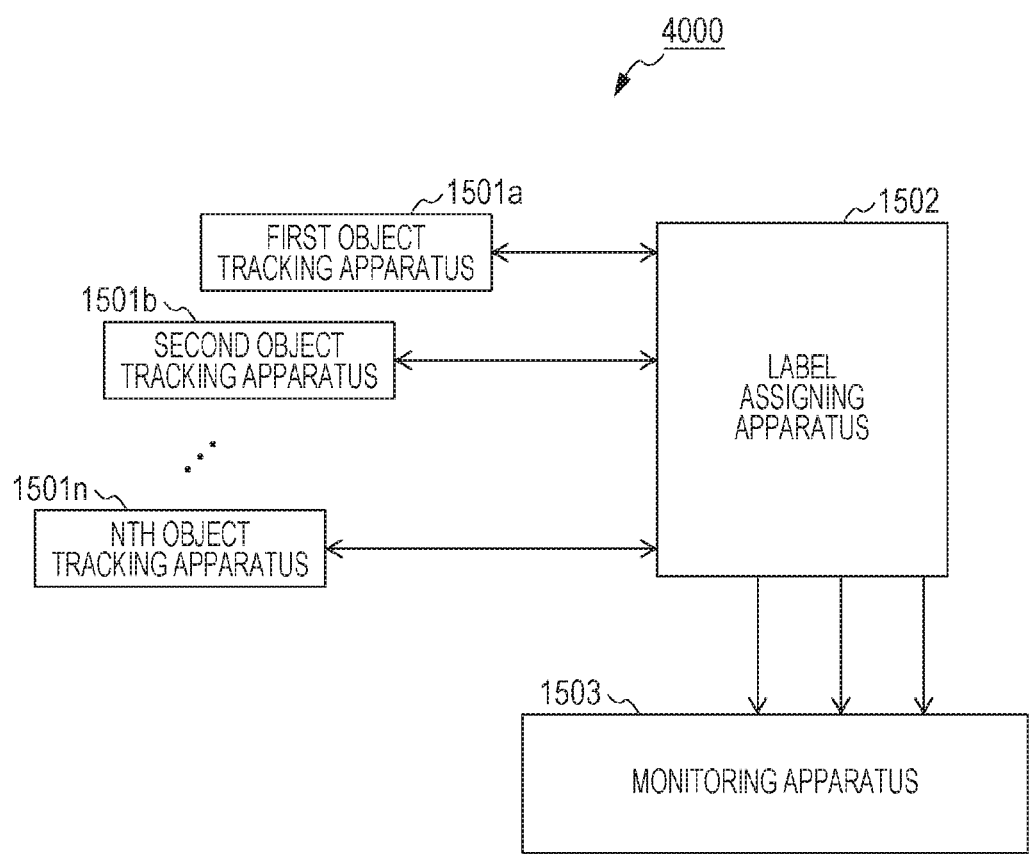

[Fig. 16]
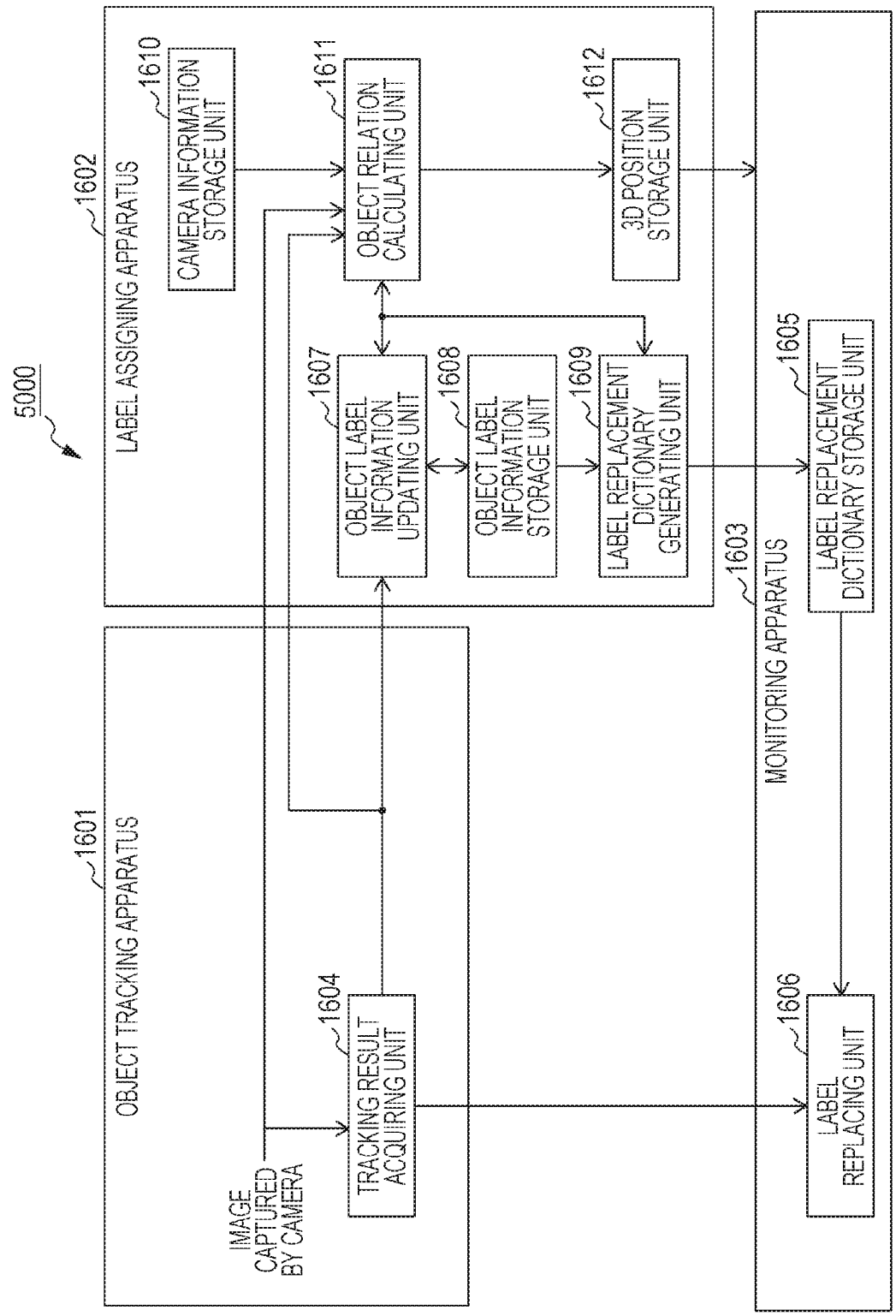

[Fig. 17A]
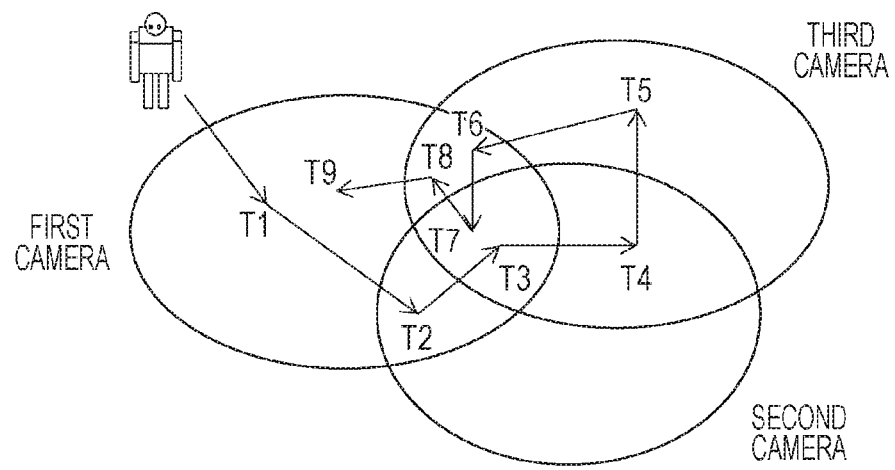
[Fig. 17B]
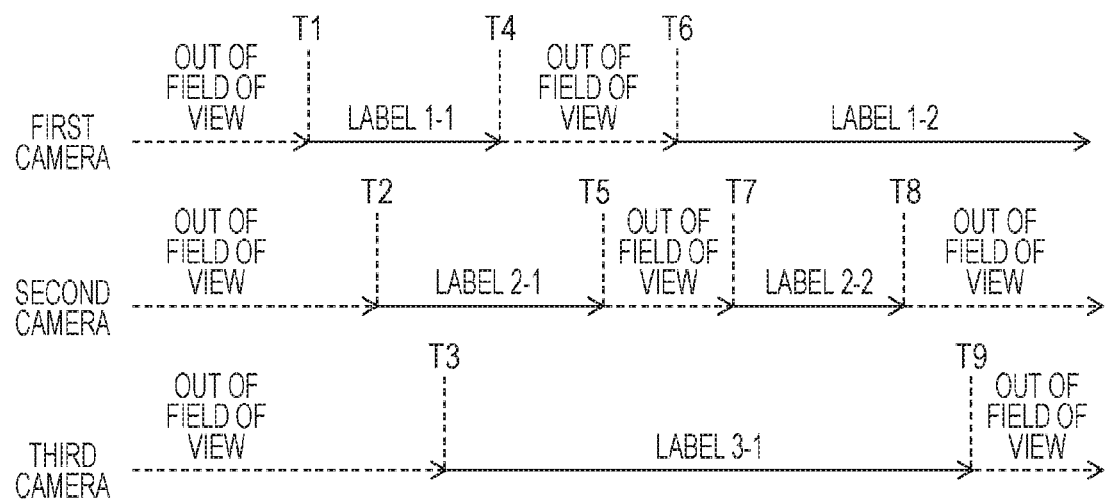

IMAGE PROCESSING APPARATUS, IMAGE PROCESSING SYSTEM, METHOD FOR IMAGE PROCESSING, AND COMPUTER PROGRAM

CROSS-REFERENCE TO RELATED APPLICATIONS

The present application is a National Phase application of International Patent Application No. PCT/JP2016/001416, filed Mar. 14, 2016, entitled "IMAGE PROCESSING APPARATUS, IMAGE PROCESSING SYSTEM, METHOD FOR IMAGE PROCESSING, AND COMPUTER PROGRAM", which claims priority to Japanese Application No. 2015-052701, filed Mar. 16, 2015, both of which are hereby expressly incorporated by reference herein in their entirety.

TECHNICAL FIELD

The present invention relates to an image processing apparatus, an image processing system, a method for image processing, and a computer program, and in particular, relates to a technique for detecting and tracking an object in a captured video image.

BACKGROUND ART

There are known surveillance camera systems for monitoring a predetermined area with an imaging device, such as a camera. For example, PTL 1 discloses a technique for capturing an image of an object using multiple cameras with overlapping fields of view to track the object across multiple camera views.

Specifically, the object is detected and tracked in each of video images captured by the cameras, thereby determining a movement path of two-dimensional coordinates of the object across image frames of the video images captured by the cameras. Three-dimensional (3D) coordinates of the object are estimated based on the movement path, thereby tracking the object across the multiple camera views.

PTL 2 discloses a technique for automatically detecting an abnormal event in a video image captured by a camera in a surveillance camera system. Specifically, whether a person in a specific place is a suspicious person is determined based on the staying time of the person in the place. If the person is a suspicious person, an alarm is generated.

For image processing associated with multiple cameras, NPL 1 describes a technique for camera calibration by allowing a camera to capture an image of a predetermined planar pattern.

NPL 2 discloses a method for obtaining a 3D structure adaptive to motion using a predetermined model estimation technique, or algorithms for estimating a 3D position with multiple cameras.

NPL 3 discloses an algorithm for multi-person tracking-by-detection. In particular, the technique (algorithm) described in this literature uses the continuous confidence of pedestrian detectors to detect and track a plurality of pedestrians.

It is assumed that multiple objects are included in a video image captured by a camera and the objects are individually tracked. To determine whether objects that appear in image frames, corresponding to different times, of the video image are the same object, each of the objects is assigned a unique code that identifies the object.

This code is called a "tracking label".

For example, according to PTL 1, individual objects included in image frames of a video image captured by each of the cameras are tracked, thus obtaining a tracking result. Tracking results for the cameras are obtained and then combined. In the related art, however, the same object may be assigned different tracking labels at different times.

FIG. 17A illustrates image capture ranges of three cameras and the motion of a person moving in the ranges. In FIG. 17A, the positions of the person at different times are indicated by T1 to T9. FIG. 17B is a timing diagram illustrating times T1 to T9 in FIG. 17A, FIG. 17B illustrates whether the person is located in the fields or field of view of a first camera, a second camera, and/or a third camera and is image-captured by the first, second, and/or third cameras and is assigned tracking labels, or whether the person is located out of the fields or field of view of the first, second, and/or third cameras. For example, it is assumed that a target object (person in FIG. 17A), serving as a moving object, takes a route in the fields of view of the first to third cameras as illustrated in FIG. 17A. For the first camera, as illustrated in the timing diagram of FIG. 17B, the target object first enters the field of view of the first camera at time T1 and is assigned a tracking label 1-1. The target object then leaves the field of view of the first camera at time T4. Consequently, such a tracking process is temporarily interrupted. After that, at time T6, the target object again enters the field of view of the first camera, and the tracking process is again started. Disadvantageously, a new tracking label 1-2 is assigned to the same target object.

In tracking a target object, serving as a moving object, in particular in a wide surveillance area, the accuracy of the tracking process is lowered because the target object often enters and leaves the fields of view of the respective cameras.

For example, if the tracking results in the above-described related art are used for automatic detection of an abnormal event as described in PTL 2, the same person may be recognized as another person. Specifically, it is assumed that whether the person is a suspicious person is determined based on the staying time as described in PTL 2. As illustrated in FIG. 17A, the person cannot be tracked at time T4 because the person temporarily leaves the field of view of the first camera (because of occlusion of the field of view). When the person again enters the field of view of the first camera at time T6, the person is recognized as another person because another tracking label is assigned to the same person in the video image captured by the same camera, as described above. It is therefore difficult to correctly measure the staying time of the person.

Since tracking labels are assigned in video images captured by respective cameras independently of one another in the related art, a single object is assigned different tracking labels in different video images. Disadvantageously, the same object is recognized as different objects. For example, in FIG. 17B, the single person is assigned the label 1-1 (at time T1) by the tracking process associated with the video image captured by the first camera. The person is assigned a label 24 (at time T2) by the tracking process associated with the video image captured by the second camera, and is further assigned a label 3-1 (at time T3) by the tracking process associated with the video image captured by the third camera. Consequently, the same object is recognized as different objects, leading to lower accuracy of the tracking process using the multiple cameras in combination.

CITATION LIST

Patent Literature

PTL 1: Japanese Patent Laid-Open No. 2010-063001
PTL 2: Japanese Patent Laid-Open No. 6-119564

Non Patent Literature

NPL 1: Zhengyou Zhang, "A Flexible New Technique for Camera Calibration", IEEE Transactions on Pattern Analysis and Machine Intelligence, 22(11): 1330-1334, 2000

NPL 2: Pierre Moulon, Pascal Monasse, and Renaud Marlet, "Adaptive Structure from Motion with a Contrario Model Estimation", ACCV, 2012

NFL 3: M. D. Breitenstein et al., "Robust Tracking-by-Detection using a Detector Confidence Particle Filter", ICCV, 2009

SUMMARY OF INVENTION

The present invention is directed to a technique for achieving highly accurate identification of a target object tracked across video images captured by multiple cameras used in combination for tracking.

Solution to Problem

According to an aspect of the present invention, an image processing apparatus includes an acquiring unit configured to acquire multiple tracking results about an object tracked in multiple video images captured by multiple imaging units. The tracking results correspond one-to-one to the video images. Each of the tracking results contains the position of the object detected from an image frame of the corresponding video image and a tracking label that identifies the object in the video image. The apparatus further includes a relating unit configured to relate objects, detected from image frames of the video images, across the video images based on the tracking results acquired by the acquiring unit to obtain relations, and an object label generating unit configured to generate an object label based on the relations obtained by the relating unit. The object label uniquely identifies the object across the video images.

Further features of the present invention will become apparent from the following description of exemplary embodiments with reference to the attached drawings.

BRIEF DESCRIPTION OF DRAWINGS

FIG. 1 is a diagram of an exemplary configuration of an image processing system according to an embodiment.

FIG. 2 is a diagram of an exemplary hardware configuration of an apparatus included in the image processing system according to the embodiment.

FIG. 3 is a diagram of a detailed functional configuration of the image processing system according to the embodiment.

FIG. 4 is a flowchart of a process performed by the image processing system according to the embodiment.

FIG. 5A is a diagram explaining the principle of relating objects across image frames of video images captured by different cameras.

FIG. 5B is a diagram explaining the principle of relating the objects across the image frames of the video images captured by the different cameras.

FIG. 6 is a diagram explaining an exemplary principle of estimating the 3D position of an object.

FIG. 7 is a diagram explaining an example of generation of a virtual object image.

FIG. 8 is a diagram illustrating exemplary organization of a label replacement dictionary in the embodiment.

FIG. 9 is a flowchart illustrating details of a process of generating the label replacement dictionary and updating object label information.

FIG. 10 is a diagram illustrating exemplary organization of the object label information in the embodiment.

FIG. 11 is a diagram explaining exemplary layout on a display screen for displaying tracking results in the embodiment.

FIG. 12 is a diagram illustrating an exemplary configuration of an image processing system according to a modification of the embodiment.

FIG. 13 is a diagram illustrating an exemplary configuration of an image processing system according to another modification of the embodiment.

FIG. 14 is a diagram of a detailed functional configuration of an image processing system according to another modification of the embodiment.

FIG. 15 is a diagram illustrating an exemplary configuration of the image processing system according to the modification of the embodiment.

FIG. 16 is a diagram of a detailed functional configuration of an image processing system according to another modification of the embodiment.

FIG. 17A is a diagram explaining an object detecting operation with multiple cameras.

FIG. 17B is a timing diagram explaining the object detecting operation with the cameras and tracking labels.

DESCRIPTION OF EMBODIMENTS

Exemplary embodiments of the present invention will be described in detail with reference to the attached drawings.

It is to be noted that the following exemplary embodiments are merely examples for implementing the present invention and can be appropriately modified or changed depending on individual configurations of apparatuses to which the present invention is applied and various conditions. Thus, the present invention is not limited to the following exemplary embodiments.

In the following description, an exemplary target object to be detected is a person. The embodiments are applicable to detection of another target object.

In the following embodiments, a movement path of an object is generated by object tracking. To distinguish movement paths of objects, a code that identifies an object to be tracked is assigned to each of the movement paths for each camera. In the following description, this code will be referred to as a "tracking label". In addition, a unique identification code is assigned to each object. This code is not changed when the corresponding object is image-captured by another camera or at another time. In the following description, this code will be referred to as an "object label".

Configuration of Image Processing System

FIG. 1 illustrates an exemplary configuration of an image processing system 1000 according to an embodiment. The image processing system 1000 includes a plurality of object tracking apparatuses 101a, 101b, . . . , and 101n, a label assigning apparatus (label processing apparatus) 102, and a monitoring apparatus 103. FIG. 1 illustrates n (n is an integer of 2 or greater) object tracking apparatuses, i.e., the first object tracking apparatus 101a, the second object tracking apparatus 101b, . . . , and the Nth object tracking apparatus 101n. The multiple object tracking apparatuses 101a to 101n, the label assigning apparatus 102, and the monitoring apparatus 103 are connected by communication links, for example, a network or a bus. FIG. 1 illustrates an example of the system configuration. The multiple object tracking apparatuses 101a to 101n, the label assigning apparatus 102, and the monitoring apparatus 103 may be integrated into the image processing system 1000.

FIG. 2 illustrates an exemplary hardware configuration of an apparatus 220 that corresponds to each of the object tracking apparatuses 101a to 101n, the label assigning apparatus 102, and the monitoring apparatus 103. The apparatus 220 of FIG. 2 may include a signal processing circuit 202, a central processing unit (CPU) 203, a read only memory (ROM) 204, a random access memory (RAM) 205, a display 206, a communication unit 207, an external memory 208, and an input unit 209, which are connected to one another by a bus 210. An imaging device 201 converts light that forms an object image on the imaging device 201 into an electrical signal, and inputs the electrical signal to the signal processing circuit 202. Examples of the imaging device 201 include a charge coupled device (CCD) image sensor and a complementary metal oxide semiconductor (CMOS) image sensor. The signal processing circuit 202 processes the electrical signal from the imaging device 201, for example, a time series signal concerning the object image, and converts the signal into a digital signal.

The CPU 203 runs a control program stored in the ROM 204 to control the apparatus 220 (i.e., the corresponding one of the object tracking apparatuses 101a to 101n, the label assigning apparatus 102, and the monitoring apparatus 103). The ROM 204 stores the control program run by the CPU 203 and a variety of parameter data. This control program is run by the CPU 203, thus allowing the apparatus 220 to function as various units for performing steps of a flowchart, which will be described later.

The RAM 205 stores a video image, such as a moving image, captured by a camera, other images and a variety of information. The RAM 205 also functions as a work area of the CPU 203 and a temporary data saving area. The apparatus 220 may include the display 206. For example, the monitoring apparatus 103 can control the display 206 to display, for example, monitoring images (tracking images), which will be described later.

The apparatus 220 may further include the external memory 208, such as a hard disk or an optical disk, and the input unit 209, including a keyboard and a mouse, through which a user operation input and data are entered.

In the present embodiment, processing operations corresponding to steps of the flowchart which will be described later may be implemented by software using the CPU 203. Some or all of the processing operations may be implemented by hardware, such as an electronic circuit.

In the present embodiment, the apparatus 220 excluding the imaging device 201 and the signal processing circuit 202 may be implemented as a general-purpose personal computer or may be implemented as a dedicated unit. The apparatus 220 may be implemented by software (programs), acquired via a network or from various storage media, running on the CPU 203.

The components of the image processing system 1000 according to the present embodiment can be embodied in various forms. For example, the components can be embodied as functions of a video camera, a still camera, a personal computer, or a smartphone. Furthermore, the components can be incorporated into an internet protocol (IP) camera, a WEB camera, a universal serial bus (USB) camera, or a wearable camera to implement such an apparatus. For example, when the components are embodied as functions of the IP camera, the IP camera may be connected to a predetermined network with a network interface. The communication unit 207 in FIG. 2 can be used as a network interface.

FIG. 3 illustrates a detailed functional configuration of the image processing system 1000 according to the present embodiment. The image processing system 1000 includes the multiple object tracking apparatuses 101 (101a to 101n), the label assigning apparatus 102, and the monitoring apparatus 103 in a manner similar to FIG. 1. The image processing system 1000 has functions of an object detecting apparatus for detecting and tracking an object in image frames of a video image, such as a moving image.

Each of the object tracking apparatuses 101 (101a to 101n) includes a tracking result acquiring unit 304, a label replacement dictionary storage unit 305, and a label replacing unit 306.

The tracking result acquiring unit 304 tracks an object in a series of image frames of a video image, captured by a camera, input from the external imaging device 201 (see FIG. 2). Thus, the tracking result acquiring unit 304 generates a tracking result that includes coordinates representing the position of the object, serving as a detection target in an image frame of the video image captured by the camera, the width and height of the object, and a tracking label. The tracking result acquiring unit 304 acquires the tracking result in this manner.

The label replacement dictionary storage unit 305 stores a label replacement dictionary for replacing a tracking label, assigned to a tracking target object by the corresponding object tracking apparatus 101, with an object label that uniquely identifies the tracking target object across the multiple object tracking apparatuses 101. The label replacement dictionary may include a table that lists records including camera numbers, tracking labels, and object labels. The organization of the dictionary will be described in detail later. The label replacing unit 306 replaces a tracking label with an object label using the label replacement dictionary stored in the label replacement dictionary storage unit 305.

The label assigning apparatus 102 includes an object label information updating unit 307, an object label information storage unit 308, a label replacement dictionary generating unit 309, a camera information storage unit 310, an object relation calculating unit 311, and a 3D position storage unit 312.

The object label information updating unit 307 receives the coordinates, the width, the height, and the tracking label of an object acquired by the tracking result acquiring unit 304 and relation information about the object across video images captured by multiple cameras. The object relation information is calculated by the object relation calculating unit 311. The object label information updating unit 307 generates an object label based on the received information, and updates object label information, serving as a candidate for a set of an object label and tracking labels, stored in the object label information storage unit 308. The object label information updating unit 307 may update the object label information for each input image frame.

The object label information storage unit 308 stores, as object label information, information for relating a tracking label to an object label. Specifically, the object label information includes a combination of tracking labels assigned in the multiple object tracking apparatuses 101 (101a to 101n)

and information about an object label corresponding to the tracking labels. The object label information will be described in detail later.

The label replacement dictionary generating unit 309 generates the label replacement dictionary (label conversion dictionary) including relationship information, used to replace a tracking label with an object label, based on the object label information stored in the object label information storage unit 308. The label replacement dictionary generating unit 309 stores the generated label replacement dictionary into the label replacement dictionary storage unit 305.

The camera information storage unit 310 stores, as camera information, intrinsic parameters, the position, and the orientation of each camera obtained by camera calibration. The position may be a position vector in, for example, a 3D space. The orientation may be a direction vector, or the orientation of the camera during image capture, for example. Camera calibration may be automatically performed by the camera information storage unit 310. Alternatively, a result of camera calibration by another apparatus may be acquired. The user may perform camera calibration manually.

The object relation calculating unit 311 acquires relation of tracking results, associated with the different cameras, acquired by the tracking result acquiring units 304. Specifically, the object relation calculating unit 311 combines a plurality of tracking results based on the coordinates of objects in image frames and the camera information (the positions and orientations of the cameras) stored in the camera information storage unit 310, and calculates the coordinates of the 3D position of a detection target object. In addition, the object relation calculating unit 311 acquires relation information about the tracking results relating to the object tracked across the video images (hereinafter, also referred to as "camera views") captured by the cameras. The object relation calculating unit 311 can calculate the relation information based on the intrinsic parameters, positions, and orientations of the cameras stored in the camera information storage unit 310.

The 3D position storage unit 312 stores the position (e.g., 3D position coordinates) of an object in the 3D space calculated by the object relation calculating unit 311.

The monitoring apparatus 103 outputs and displays tracking results in the video images captured by the cameras. Specifically, the monitoring apparatus 103 acquires the video images captured by the cameras and the tracking results of an object in the video images from the respective object tracking apparatuses 101 (101a to 101n), and acquires the 3D position coordinates of the object from the label assigning apparatus 102. The monitoring apparatus 103 can perform various processes, such as display of tracking results acquired by the object tracking apparatuses 101 (101a to 101n) and detection of a predetermined event based on the tracking results. The processes performed by the monitoring apparatus 103 will be described in detail later.

[Image Processing Operation of Image Processing System]

An operation of the image processing system 1000 according to the present embodiment will be described with reference to the flowchart of FIG. 4. In the flowchart of FIG. 4, the multiple object tracking apparatuses 101 (101a to 101n), the label assigning apparatus 102, and the monitoring apparatus 103 perform a process in cooperation with one another. For example, the label assigning apparatus 102 can execute step S401 and steps S404 to S409. Furthermore, the object tracking apparatuses 101 (101a to 101n) can execute steps S402, S403, and S410. Additionally, the monitoring apparatus 103 can execute step S411.

Although the present embodiment will be described as applied to an example in which three cameras are arranged such that the fields of view of the cameras overlap one another, the number of cameras may be any number greater than or equal to 2.

In step S401, camera calibration is performed to estimate the intrinsic parameters, the position, and the orientation of each of the cameras. For example, a calibration board can be placed in an environment where a detection target object is located, and the intrinsic parameters of each camera can be obtained using the technique disclosed in NPL 1. According to this technique, the camera is allowed to capture images of a predetermined planar pattern, and is then calibrated. Furthermore, the position and orientation of each camera can be estimated using another calibration marker placed in the environment. These techniques may be used independently or in combination. Information about, for example, the intrinsic parameters, position, and orientation of each camera obtained in the above-described manner is stored as camera information in the camera information storage unit 310 in FIG. 3.

Although camera calibration is performed in the above-described manner in the present embodiment, camera calibration may be performed using any other method. For example, feature points, such as corners or scale-invariant feature transform (SIFT) features, in a video image captured by a camera are extracted, and the feature points are related across image frames of video images captured by different cameras. After that, the positions and orientations of the cameras and the feature points may be estimated based on motion across the image frames. For example, the position and orientation of a camera can be estimated using the technique (algorithms) disclosed in NPL 2. The intrinsic parameters, position, and orientation of each camera may be obtained simultaneously.

In step S402, the tracking result acquiring unit 304 of each of the object tracking apparatuses 101 (101a to 101n) acquires an image frame from a video image output from the corresponding camera. Since the three cameras are arranged in the present embodiment, the three object tracking apparatuses 101 acquire three image frames.

In step S403, the tracking result acquiring unit 304 of each of the object tracking apparatuses 101 (101a to 101n) tracks an object in the image frame acquired in step S402, and extracts a human body region and a tracking label in the image frame. In the present embodiment, an example of a detection target object is a person and a region where the person is located is called a human body region. Another object other than a person may be used and a region where the object other than a person is located may be used. As regards an object tracking algorithm, the technique disclosed in NFL 3 can be used. Any other algorithm may be used.

As a result of extraction of the human body region, the tracking result acquiring unit 304 acquires the coordinates (x, y) of a representative point of, for example, a rectangular region representing the human body region, and a height h and a width w of the region. In addition, the tracking result acquiring unit 304 acquires a tracking label that distinguishes the extracted human body region from another person and another region.

The tracking result output from the tracking result acquiring unit 304 is stored into a temporal storage unit, such as a RAM (e.g., the RAM 205 in FIG. 2), included in the corresponding object tracking apparatus 101, and is also transmitted to the object label information updating unit 307 of the label assigning apparatus 102 via the predetermined communication link.

In step S404, the object relation calculating unit 311 of the label assigning apparatus 102 performs processing of relating persons, detected in S403, across the image frames obtained from two of the cameras. Specifically, the object relation calculating unit 311 searches the image frames of the two cameras to determine which person in the image frame of one of the cameras corresponds to a person detected in the image frame of the other camera.

In this case, persons (human bodies) can be related across the image frames by relating the representative points of the human body regions of the persons in accordance with the principle of epipolar geometry. An example of relation in accordance with the epipolar geometry will now be described with reference to FIG. 5.

As illustrated in FIGS. 5A and 5B, a representative point of a human body region A, or person A on a projection plane (image frame) of a first camera is represented by a star-shaped black mark. On a projection plane (image frame) of a second camera or another camera, the representative point is represented by a line, called an epipolar line, illustrated in a right image frame of the second camera in FIG. 5A. In other words, the epipolar line can be called a line that connects the center of view of the first camera to the representative point of the human body region of the person A in the image frame of the second camera.

A fundamental matrix F containing information about the positional relationship between the image frames of the first and second cameras can be calculated based on, for example, the positions, orientations, and intrinsic parameters of the cameras. Let x denote a vector representing two-dimensional coordinates of the representative point of the human body region of the person A. The epipolar line, 1, can be expressed by the following expression.

$$l = Fx \quad (1)$$

A person corresponding to a human body region having a representative point located at a predetermined distance or less from the epipolar line can be selected, thus achieving relation across the image frames of the two cameras. For example, referring to FIG. 5A, a person B and a person C in the image frame of the second camera are candidates for the person A in the image frame of the first camera. In principle, however, a person in an image frame of another camera (for example, the second camera) corresponding to a person (for example, the person A) in the image frame of the first camera should be one person per camera.

Combinations of persons that can be related are obtained so as to satisfy the above-described requirement. For example, FIG. 5A illustrates current image frames. In FIG. 5A, the persons B and C in the image frame of the second camera can be related to the person A in the image frame of the first camera. As potential combinations, for example, {A, B} and {A, C} are generated.

Referring again to FIG. 4, in step S405, the 3D positions of the persons are estimated using tracking labels based on the combinations of persons related in step S404. FIG. 6 is a diagram illustrating the principle of estimating the 3D position.

As illustrated in FIG. 6, a line passing through an optical center 601a of the first camera and a representative point 601b of a human body region in an image frame 601 of the first camera is obtained in the 3D space. Similarly, a line passing through an optical center 602a of the second camera and a representative point 602b of a human body region in an image frame 602 of the second camera is obtained in the 3D space. These lines can be obtained based on the positions, orientations, intrinsic parameters of the cameras and the coordinates of the representative points 601b and 602b in the image frames.

The intersection of the lines obtained with respect to the cameras is obtained as the 3D position of a person. These lines may actually fail to intersect at one point because of estimation errors caused when the lines are obtained. In this case, a point at which the sum of distances from the lines is minimized may be used instead of the intersection, and be used as the 3D position of the person.

Referring again to FIG. 4, in step S406, a virtual object image may be eliminated from any of the 3D positions obtained in step S405. The term "virtual object image" as used herein refers to a phenomenon that the 3D position of a nonexistent person is estimated as a virtual object image at the intersection of lines connecting objects and cameras. Referring to FIG. 7, a point 701a represents an optical center of a field of view 701 of the first camera. A point 702a represents an optical center of a field of view 702 of the second camera and a point 703a represents an optical center of a field of view 703 of the third camera. In this case, one person B is seen in the field of view 701 of the first camera. On the other hand, a person A and the person B, or two persons are seen in the field of view 702 of the second camera. If it is determined that the person in the field of view 701 of the first camera corresponds to the person A in the field of view 702 of the second camera, the position of a virtual object image 710 may be erroneously obtained as the 3D position of the person.

In the present embodiment, such a virtual object image is eliminated by using past frames subjected to tracking. Specifically, a virtual object image may be eliminated by retrieving image frames that include a person who has not been related from relations across past image frames with respect to persons.

For example, in FIG. 5A, {A, B} and {A, C} are generated as the combinations of persons that can be related to the person A in the image frame of the first camera. A 3D position estimated from either one of the combinations corresponds to a virtual object image. For example, if the correct combination of the persons is {A, B}, a 3D position obtained from the combination of the persons {A, C} corresponds to a virtual object image as illustrated in FIG. 7.

FIG. 5B, which illustrates past image frames, demonstrates that the person A is not related to the person C. It can be seen that the 3D position generated based on the combination {A, C} corresponds to a virtual object image. Thus, the 3D position obtained from the combination {A, C} can be eliminated.

Referring again to FIG. 4, in step S407, objects in the image frames of the multiple cameras are related based on the 3D position. Step S407 is executed when an object is tracked across video images captured by three or more cameras. In other words, since the relations obtained in step S404 are for objects in image frames of two cameras, objects in video images captured by three or more cameras are related using the result obtained in step S404.

To obtain this relation, groups of 3D positions located at a threshold distance or less from one another are retrieved. Then, combinations (for example, the above-described combinations of persons) of objects that belong to the groups and are related across two camera views are collected. After that, objects included in the collected combinations are determined as objects related across multiple camera views. In other words, objects located at 3D positions close to each other obtained by relations across image frames of two cameras are estimated as the same object (e.g., the same person), and are then related.

A result of relation of objects across image frames of multiple cameras may be, for example, a combination of tracking labels in image frames of the cameras arranged in order of the camera number.

If an object does not appear in an image frame of any of the cameras or if tracking the object fails, a tracking label for the object may be missing in the image frame of the camera. In the present embodiment, an invalid label X indicating that the tracking label is missing is given instead of the missing tracking label.

Specifically, if a tracking label is missing, the invalid label X is stored as a tracking label to generate a result of relation of objects in image frames of video images captured by multiple cameras. For example, it is assumed that an object in an image frame of the first camera is assigned 3 as a tracking label, tracking of the object fails in an image frame of the second camera, and the object is assigned 5 as a tracking label in an image frame of the third camera. In this case, the result of relation of the objects in the image frames of video images captured by the multiple cameras is, for example, (3, X, 5). A tracking result for a camera assigned the invalid label X may be excluded in relation of objects, updating of object label information (table), which will be described later, and estimation of the 3D position of an object.

In step S407, objects (estimated to be) seen in video images from more cameras may be preferentially related. It is considered, based on the features of multi-view geometry, that the reliability of relating persons across views of cameras increases as the persons are detected with more cameras.

In the present embodiment, the 3D position of the object in step S405 can be estimated by processes equal in number to the cameras. Relating objects across image frames of video images from more cameras can estimate the 3D position of a target corresponding to the objects with higher accuracy. For example, the 3D position of an object detected from video images from two or more cameras can be obtained by stereo vision based on the above-described epipolar geometry. In video image capture using only one camera, for example, the height of an object (for example, the height of a person) or the width of an object (for example, the length of a vehicle) may be estimated using a certain value to estimate a virtual 3D position. Furthermore, formation about a distance may be externally provided. The height and the width are examples of the size of an object. The processing of relating objects in steps S404 to S407 may be performed by the object relation calculating unit 311 of the label assigning apparatus 102.

In step S408, a label replacement dictionary 800 is generated based on the relation of the objects across the multiple camera views obtained in step S407 and the object label information stored in the object label information storage unit 308. The label replacement dictionary 800 describes the replacement relationship between tracking labels and object labels. The relation of the objects across the multiple camera views includes a combination of tracking labels assigned. The object label information will be described later with reference to FIG. 10. Step S408 may be performed by the label replacement dictionary generating unit 309.

Furthermore, in step S408, the object label information stored in the object label information storage unit 308 is updated.

FIG. 8 illustrates exemplary organization of the label replacement dictionary 800. In FIG. 8, the label replacement dictionary 800 is a table having a plurality of columns (vertical "items"). Specifically, the label replacement dictionary 800 contains a camera number 801, a tracking label 802 assigned to an object detected in a video image captured by a camera with the camera number, and an object label 803 generated for the object. The apparatuses of the image processing system 1000 can acquire the object label 803 based on the camera number 801 and the tracking label 802 by referring to the label replacement dictionary 800. The generation of the label replacement dictionary and processing of the object label information in step S408 in the present embodiment will be described in detail later.

In step S409, the label replacement dictionary 800 generated in step S408 is transmitted to each of the object tracking apparatuses 101 (the first object tracking apparatus 101a, the second object tracking apparatus 101b, . . . , and the Nth object tracking apparatus 101n) via the predetermined communication links. Each of the object tracking apparatuses 101 (101a to 101n) receives the label replacement dictionary 800 and stores the received label replacement dictionary 800 into the label replacement dictionary storage unit 305 included in the object tracking apparatus 101. The label replacement dictionary 800 received by the object tracking apparatus 101 may be part extracted from the label replacement dictionary 800 generated by the label replacement dictionary generating unit 309 of the label assigning apparatus 102. For example, the extracted part may contain a set of a camera number, a tracking label, and an object label. The camera number is assigned to a video image input to each object tracking apparatus 101 from the corresponding camera. The tracking label is assigned to an object in the video image assigned the camera number. The object label corresponds to the tracking label and uniquely identifies the object across video images from the multiple cameras.

Step S409 may be performed by the label replacement dictionary generating unit 309 of the label assigning apparatus 102 and the label replacement dictionary storage unit 305 of the object tracking apparatus 101 in cooperation with each other through the communication units 207.

In step S410, each of the object tracking apparatuses 101 checks the tracking label and the camera number contained in the tracking result acquired in step S403 against the label replacement dictionary 800. Thus, the object tracking apparatus 101 acquires the object label and replaces the tracking label in the tracking result with the object label, or sets the object label in place of the tracking label. Step S410 may be performed by the label replacing unit 306 in FIG. 3. The tracking result, which contains the object label set in place of the tracking label by the label replacing unit 306, contains the object label and information about, for example, the 2D coordinates, the width, and the size of the object. Alternatively, the label replacing unit 306 may add the object label to the tracking label in the tracking result. The tracking result subjected to replacement is transmitted from the label replacing unit 306 to the monitoring apparatus 103, illustrated in FIG. 3, via the predetermined communication link.

In step S411, the monitoring apparatus 103 receives the tracking result, which contains the object label set in place of the tracking label, from each of the object tracking apparatuses 101, and then performs monitoring. In the monitoring, the tracking results can be properly displayed and an event can be properly detected. The monitoring will be described in detail later.

In step S412, whether to continue the process (steps S401 to S411) is determined. For example, if the tracking result acquiring unit 304 can acquire another image frame from the corresponding camera, the process returns to step S402. If it is difficult to acquire another image frame, the process is terminated.

Generating Label Replacement Dictionary and. Updating Object Label Information in Label Assigning Apparatus 102

Step S408 in FIG. 4, that is, the process of generating the label replacement dictionary and updating object label information performed by the label assigning apparatus 102 will now be described in detail with reference to a flowchart of FIG. 9.

The process of FIG. 9 can be executed by the object label information updating unit 307 and the label replacement dictionary generating unit 309 in cooperation with each other in the label assigning apparatus 102.

In step S408 in FIG. 4, the label replacement dictionary 800 is generated and object label information. 1010 is updated based on a group of relations (relation information blocks) of the objects across the multiple camera views obtained in step S407 and the object label information stored in the object label information storage unit 308.

As described above, each relation information block contains a combination of tracking labels, assigned to an object, in the video images captured by the respective cameras such that the tracking label are arranged in order of, for example, the camera number.

FIG. 10 illustrates exemplary organization of the object label information 1010. As illustrated in FIG. 10, the object label information 1010 may be a table that contains tracking label items 1001, 1003, and 1004 for the respective cameras and an object label item 1002 such that the items are arranged as columns. In the object label information 1010, the invalid label X indicating that label information is missing can be added. For example, the invalid label X indicating that object tracking with the second camera has failed is included in the tracking label item 1003 for the second camera, which is the second column from the left in FIG. 10. The label replacement dictionary 800 can be generated based on the object label information 1010. As illustrated in FIG. 8, the label replacement dictionary 800 may be a table that lists the camera number item 801, the tracking label item 802, and the object label item 803 arranged as columns.

Referring again to FIG. 9, in step S901, the group of relations (relation information blocks) of the objects across the multiple camera views and the object label information 1010 stored in the object label information storage unit 308 are input.

In step S902 in FIG. 9, the label replacement dictionary 800 is initialized. For example, the initialization may be performed by deleting all of entries (corresponding to rows of the table of the label replacement dictionary 800) in the label replacement dictionary 800. The initialization can be performed by the label replacement dictionary generating unit 309.

In step S903, any one of the relation information blocks input in step S901 is selected as a processing target. This selection may be performed by the object label information updating unit 307. Steps S903 to S907, which correspond to updating the object label information 1010, may be performed by the object label information updating unit 307.

In step S904, an entry (hereinafter, referred to as a "maximum entry") that has maximum similarity to the relation information selected in step S903 is retrieved as an entry having a high likelihood of relation from the object label information 1010.

In the following description of the present embodiment, the number of cameras associated with the same tracking label is used as similarity. For example, the similarity, S, of each of the entries to the selected relation information can be calculated as the similarity between relation information, m, and tracking label information, t, in the entry by the following expression.

$$S(m, t) = \sum_c \delta(m_c, t_c) \qquad (2)$$

In Expression (2), c denotes the camera number, $m=\{m_1, m_2, \ldots, m_c, \ldots\}$ denotes the relation information, or a vector including tracking labels $m_c$ arranged in order of the camera number c, $t=\{t_1, t_2, \ldots, t_c, \ldots\}$ denotes tracking label information in each entry in the object label information 1010, or a vector including tracking labels $t_1$ for the cameras arranged in order of the camera number c, and $\delta(i, j)$ denotes a function that returns 1 when i matches j, namely, the tracking labels match each other.

In the present embodiment, $\delta(i, j)$ is expressed in consideration of the invalid label X by the following expression.

$$\delta(i, j) = \begin{cases} 1 & i = j \text{ and } i \neq X \text{ and } j \neq X \\ 0 & \text{other} \end{cases} \qquad (3)$$

For example, if a tracking target object is a moving object, the number of cameras for detecting and tracking the object in a video image changes in time series. For example, two cameras are used to capture image frames at a certain time point, three cameras are used to capture image frames at another time point, and video images captured in this manner are output from the cameras. In the present embodiment, the invalid label X is used. When any of the cameras does not capture an image, the tracking label for the camera is excluded, and the similarity is then calculated.

In step S905 in FIG. 9, whether the similarity of the maximum entry obtained in step S904 is greater than or equal to 1 is determined. If there is no maximum entry or the similarity is less than 1, this means that the tracking labels contained in the relation information have not been assigned an object label (NO in step S905). It is therefore determined that a new object to be tracked appears. The process proceeds to step S906 to assign a new object label to the new object. On the other hand, when the maximum entry has similarity greater than or equal to 1, the presence of the corresponding object label is determined. The process proceeds to step S907 to update the maximum entry with the selected relation information (YES in step S905).

In step S906, a new object label is assigned to the input relation information, and a set of the assigned object label and the input relation information is added to the object label information 1010. Specifically, an entry (hereinafter, referred to as a "new entry") containing the combination of the tracking labels for the cameras contained in the relation information and the new object label is added to the table of the object label information 1010 of FIG. 10.

In step S906, for example, it is assumed that the relation information indicates that an object in an image frame from the first camera is assigned 3 as a tracking label, an object in an image frame from the second camera is assigned the invalid label X as a tracking label, and an object in an image frame from the third camera is assigned 5 as a tracking label. When the new object label is A, a new entry (3, X, 5, A) is added to the table of the object label information 1010.

On the other hand, in step S907 in FIG. 9, the maximum entry, contained in the object label information 1010, obtained in step S904 is updated with the input relation information. Specifically, a tracking label contained in the maximum entry may be overwritten with a tracking label contained in the relation information.

For example, assuming that the tracking label for a certain camera contained in the relation information indicates 3 and the tracking label in the maximum entry indicates 5, the tracking label in the maximum entry is replaced with 3. If the tracking label for a certain camera in the relation information is indicated by the invalid label X, the tracking label in the maximum entry is not updated.

The object label information 1010 containing the new entry added in step S906 in FIG. 9 or the object label information 1010 updated in step S907 is stored into the object label information storage unit 308. Steps S904 to S907 can be performed by the object label information updating unit 307 in FIG. 3.

In step S908 in FIG. 9, the label replacement dictionary 800 is updated with the new entry added in step S906 or the maximum entry updated in step S907. Specifically, the relationship between the camera number 801, the tracking label 802, and the object label 803 described in the new or maximum entry is added to the label replacement dictionary 800. For example, it is assumed that the tracking label assigned to an object in an image frame from the first camera is 3 and the invalid label X is assigned to an object in an image frame from the second camera in the new or maximum entry. When the tracking label assigned to an object in an image frame from the third camera is 5 and the object label is A, two entries (1, 3, A) and (3, 5, A) are added to the table of the label replacement dictionary 800. Step S908 may be performed by the label replacement dictionary generating unit 309.

Updating of the label replacement dictionary in step S908 in FIG. 9 will be described from another viewpoint. As described above, an entry having maximum similarity to the input relation information is retrieved from the object label information 1010 and is selected in step S904.

The maximum similarity means that a combination of tracking labels contained in the relation information has a high likelihood of relating to a combination of tracking labels contained in the object label information. In other words, the relationship between (or a set of) the combination of the tracking labels having a high likelihood and the object label is retrieved from the object label information 1010. The relationship with the high likelihood is stored into the label replacement dictionary 800.

The maximum similarity suggests that the number of cameras capturing an image of a tracking target object is large, as described with respect to Expressions (2) and (3). In terms of higher reliability in tracking with more cameras for image capture, an entry having maximum similarity is selected and is preferentially retrieved from the object label information 1010 in the present embodiment. In step S908, the label replacement dictionary is updated to reflect the entry.

Note that the relations of objects across the multiple camera views obtained in step S407 in FIG. 4 may be wrong. The object label information 1010 updated in step S408 may contain wrong information accordingly. In the present embodiment, wrong relation information can be eliminated or reduced by selecting an entry having a high likelihood.

In step S909, whether to continue processing in steps S903 to S908 in the flowchart of FIG. 9 is determined. If all of the relation information blocks input in step S901 have been selected and processed in step S903, the process proceeds to step S910 in FIG. 9. In step S910, the updated object label information 1010 and the updated label replacement dictionary 800 are output as the result of processing up to step S909. Specifically, the table of the updated object label information 1010 is obtained. On the other hand, if not all the relation information blocks are selected in step S903, the process returns from step S909 to step S903. The process is continued to process a relation information block that is not processed.

Image Display Processing by Monitoring Apparatus 103

Image display processing, performed by the monitoring apparatus 103, in step S411 in FIG. 4 will now be described in detail. In step S411, the monitoring apparatus 103 receives the tracking result, containing the object label set in place of the tracking label, from each of the object tracking apparatuses 101. The monitoring apparatus 103 displays the received tracking results, and further, can perform a monitoring process for event detection.

Display of the tracking results by the monitoring apparatus 103 will now be described. FIG. 11 illustrates exemplary layout on a display screen for displaying the tracking results. The exemplary layout on the display screen, 1110, may include one or more camera images 1101a, 1101b, 1101c, and 1101d, and a 3D map 1104. Although four windows for the first camera image 1101a, the second camera image 1101b, the third camera image 1101c, and the fourth camera image 1101d are displayed in FIG. 11, any number of windows may be displayed such that the windows are equal in number to the cameras.

In step S403, as illustrated in FIG. 11, symbols (e.g., framed symbols) 1105a and 1105b representing tracked human body regions may be displayed in the camera images 1101a to 1101d such that the symbols can be distinguished by, for example, superimposing the symbols on the human body regions. Framed symbols representing the same person may have the same color in different camera images so that the user can easily identify the person detected in the different camera images. For example, assuming that the framed symbol 1105a represents a person A and the framed symbol 1105b represents a person B, the symbols 1105a and 1105b may have different colors.

On the 3D map 1104, a symbol 1103 representing the 3D position or size of an object (e.g., a person) to be retrieved and a symbol 1102 representing the position or orientation of a camera may be displayed such that these symbols are displayed as 3D images together with a floor. Referring to FIG. 11, symbols 1103a and 1103b and symbols 1102a, 1102b, 1102c, and 1102d are displayed. The symbols on the 3D map 1104 may be colored so that the user can easily distinguish the persons in the camera images 1101a to 1101d and the 3D map 1104. For example, assuming that the symbols 1105b and 1103b correspond to the same person, the symbols 1105b and 1103b may framed symbols of the same color.

To achieve the above-described display, the monitoring apparatus 103 acquires the 3D position of each object and the object label assigned to the object from the label assigning apparatus 102.

Furthermore, the monitoring apparatus 103 acquires the tracking results obtained with the cameras and the object labels associated with the tracking results from the object tracking apparatuses 101, and further acquires the camera images from the apparatuses 101. The monitoring apparatus 103 can display the camera images 1101a to 1101d, as illustrated in FIG. 11, by using the acquired camera images.

The monitoring apparatus 103 displays the symbols 1105a and 1105b, representing the human body regions, in the camera images 1101a to 1101d on the display screen 1110 such that the symbols 1105a and 1105b can be related to the symbols 1103a and 1103b, each representing the 3D position or size of a human body, on the 3D map 1104.

The relations between the symbols 1105a and 1105b representing the human body regions and the symbols 1103a and 1103b representing the 3D positions or sizes of the human bodies are revealed by checking matching of the object labels in the tracking results and the object labels associated with the 3D positions. The tracking target persons determined as the same person in the camera images 1101a to 1101d and the 3D map 1104 can be displayed in the same color in accordance with the revealed relations.

In the present embodiment, an example of estimation of the 3D position of an object by triangulation based on multiple view geometry has been described with reference to, for example, FIG. 6.

In the present embodiment, for example, the 3D position of a target object detected across image frames of video images captured by multiple cameras is estimated as described above. If a certain image frame of a video image is missing the target object (missing detection), the target object can be projected onto this image frame based on the estimated 3D position, so that the position of the target object can be estimated in the image frame. Specifically, a physical obstruction (e.g., a building or fog), image capture conditions (e.g., backlight), or another obstruction may impede the detection of the target object in a video image captured by a certain camera (e.g., the third camera). In this case, the 3D position estimated based on image frames of the video images captured by the first and second cameras may be projected to a position where the target object can appear in the image frame of the video image captured by the third camera, thus complementing the missing detection. For example, the monitoring apparatus 103 can display a symbol representing a detection frame of a human body region that corresponds to the missing detection at an estimated 3D position in the third camera image 1101c on the display screen 1110. Since the symbol 1105 representing the detection frame indicates the estimated position, this symbol may be displayed in a different color or brightness from the other normal symbols 1105.

Event detection performed by the monitoring apparatus 103 will now be described. In this event detection, for example, the monitoring apparatus 103 detects a predetermined event based on the tracking results from the object tracking apparatuses 101 and the object labels contained in these results, and generates an alarm indicating the detected event.

In the present embodiment, for example, it is assumed that the monitoring apparatus 103 detects a person staying for a predetermined period of time or longer in a surveillance area image-captured by predetermined surveillance cameras, for example, the first camera and the second camera.

Specifically, the monitoring apparatus 103 stores tracking results in image frames of video images captured by the respective cameras and an object label associated with each of the tracking results into a storage area of, for example, the RAM 205.

The monitoring apparatus 103 searches the storage area for the tracking results containing a predetermined object label to determine whether the predetermined object label appears in any of the image frames from the first and second cameras earlier than a predetermined time point. If the predetermined object label appears, the monitoring apparatus 103 can determine that a person assigned the predetermined object label has continuously stayed in the surveillance area for the predetermined period of time or longer, and generate an alarm to report a suspicious person.

In the present embodiment, the same object that appears in video images captured by different cameras or at different times can be assigned the same label. Specifically, according to the present embodiment, whether objects that appear in video images captured by different cameras, or alternatively, objects that appear in image frames, corresponding to different times, of the video image captured by the same camera are the same object can be more accurately determined based on the object label.

Consequently, the same object can be effectively prevented from being assigned different tracking labels at different times. Furthermore, the same object can be effectively prevented from being assigned different tracking labels in an image captured by a camera. In addition, whether objects in image frames of video images captured by different cameras, or alternatively, objects in image frames corresponding to different times are the same object can be determined more accurately.

In the present embodiment, the object label information storage unit 308 is provided as a component for storing information to relate a tracking label for each of the cameras to an object label. The object label information storage unit 308 stores the information. Consequently, if tracking of a detection target object is interrupted in the video image captured by any of the cameras, as long as tracking of the object is continued in the video images captured by the other cameras, the same object can be continuously assigned the same object label.

Specifically, with reference to the timing diagram of FIG. 17B, tracking of the label 1-1 with the first camera is interrupted but tracking with the second camera and tracking with the third camera are continued. Consequently, the same object label can be continuously assigned while tracking in the video image captured by the first camera is interrupted. As described above, the object label information updating unit 307 updates the object label information 1010 with the relations of the objects across the camera views. Consequently, if the tracking label of a certain object in the video image captured by any of the cameras is changed, the same object label can be continuously assigned as long as tracking of the object in the video images captured by the other cameras is continued.

For example, it is assumed that the label 1-1 assigned to the object in the video image captured by the first camera is changed to the label 1-2 at time T6 in the timing diagram of FIG. 17B in this case, the same object label can be continuously assigned because tracking of the object is continued with the third camera.

Consequently, for example, if a large target area is monitored with many cameras and an object, for example, a moving object, is detected and tracked, the object can be tracked accurately.

Modifications of Embodiment

Although the image processing system 1000 according to the present embodiment includes, as illustrated in FIG. 1, the object tracking apparatuses 101, the label assigning apparatus 102, and the monitoring apparatus 103 as described above, the image processing system 1000 may have any configuration other than that in FIG. 1. Any of the apparatuses may have functions of the other apparatuses. For example, each object tracking apparatus 101 may have the functions of the label assigning apparatus 102 and the label assigning apparatus 102 may be omitted.

Furthermore, the monitoring apparatus 103 may have the functions of the label assigning apparatus 102 and the label assigning apparatus 102 may be omitted. In addition, each object tracking apparatus 101 may have the functions of the label assigning apparatus 102 and the monitoring apparatus 103. One object tracking apparatus 101 may have the functions of the object tracking apparatuses 101*a* to 101*n*. Allowing one apparatus to have functions of multiple apparatuses reduces the number of apparatuses, thus simplifying the configuration of the system.

In the above-described configuration in which one apparatus is allowed to have functions of multiple apparatuses, instead of exchanging data between modules via a communication link, data may be stored in a temporal storage unit, such as a RAM, and a plurality of functions may be implemented by a single CPU. Furthermore, the functions may be implemented by a single program.

FIG. 12 illustrates an exemplary configuration of an image processing system 2000 configured such that at least one of the first to Nth object tracking apparatuses 101*a* to 101*n* in FIG. 1 has the functions of the label assigning apparatus 102.

In FIG. 12, a first object tracking apparatus 1201*a* includes a label assigning unit 1202 and a second object tracking apparatus 1201*b* includes a label assigning unit 1202*b*. This results in a reduction in the number of apparatuses, thus simplifying the configuration of the system. Furthermore, each of the object tracking apparatuses 1201*a* and 1201*b* can autonomously assign a tracking label and an object label to itself without using another apparatus. For example, if object tracking apparatuses 1201*a*, 1201*b*, 1201*c*, and 1201*n* are cameras having an object tracking function, such as IP cameras, the cameras can directly communicate with one another. Thus, whether tracking target objects that appear in video images captured by different cameras or at different times are the same object can be determined by only such a group of cameras. Consequently, the system configuration can be further simplified, thus providing ease of use to a camera user or an apparatus that uses a camera.

As illustrated in FIG. 12, the image processing system 2000 includes the two object tracking apparatuses 1201*a* and 1201*b* including the label assigning units 1202*a* and 1202*b*, respectively. The image processing system 2000 further includes the two object tracking apparatuses 1201*c* and 1201*n*. In and a monitoring apparatus 1203. The object tracking apparatuses 1201*c* and 1201*n* do not include any label assigning units. Each of the number of object tracking apparatuses including the label assigning unit and the number of object tracking apparatuses including no label assigning unit is not limited to two, as illustrated in FIG. 12.

Furthermore, although the communication link is provided between the label assigning apparatus 102 and the monitoring apparatus 103 in the above-described embodiment as illustrated in FIG. 1, the communication link may be omitted.

FIG. 13 illustrates an exemplary configuration of an image processing system 3000 in which there is no communication link between a label assigning apparatus 1302 and a monitoring apparatus 1303. In this configuration, the apparatuses have a simplified configuration. In some embodiments, display of a 3D position on a display screen may be omitted. Furthermore, in this modification, the label assigning apparatus 1302 calculates the 3D position of an object, in some embodiments, the monitoring apparatus 1303 may recalculate the 3D position of a detection target object based on tracking results from object tracking apparatuses 1301 by using the same procedure as processing in step S405 in FIG. 4.

Furthermore, object tracking apparatuses 1301*a*, 1301*b*, . . . , and 1301*n* may include all or some of the functions of the label assigning apparatus 1302 so that the image processing system 3000 of FIG. 13 has the same advantages as those of the image processing system 2000 of FIG. 12.

Furthermore, although the communication link is provided between each object tracking apparatus 101 and the monitoring apparatus 103 in the above-described embodiment as illustrated in FIG. 3 (the system configuration is illustrated in FIG. 1), the communication link may be omitted.

FIG. 14 illustrates an exemplary functional configuration of an image processing system 4000 configured such that there is no communication link between an object tracking apparatus 1401 and a monitoring apparatus 1403. FIG. 15 illustrates an exemplary configuration of the image processing system 4000 of FIG. 14.

In this configuration, as illustrated in FIG. 14, a label assigning apparatus 1402 may include a label replacing unit 1406 and a label replacement dictionary storage unit 1405. A tracking result acquiring unit 1404, an object label information updating unit 1407, an object label information storage unit 1408, a label replacement dictionary generating unit 1409, a camera information storage unit 1410, an object relation calculating unit 1411, and a 3D position storage unit 1412 are equivalent to the tracking result acquiring unit 304, the object label information updating unit 307, the object label information storage unit 308, the label replacement dictionary generating unit 309, the camera information storage unit 310, the object relation calculating unit 311, and the 3D position storage unit 312 in FIG. 3, respectively. Tracking results obtained by object tracking apparatuses 1501*a*, 1501*b*, . . . , and 1501*n* illustrated in FIG. 15 may be transmitted to a monitoring apparatus 1503 via a label assigning apparatus 1502.

In this case, the monitoring apparatus 1503 can acquire the tracking results, each of which contains an object label that is unique to an object and is set in place of a tracking label assigned by the corresponding one of the object tracking apparatuses 1501*a*, 1501*b*, . . . , and 1501*n*. Consequently, whether objects that appear in video images captured by different cameras or at different times are the same object can be determined more accurately. In addition, since a communication link for transmitting tracking result information can be eliminated between the monitoring apparatus 1503 and each object tracking apparatus 1501, the apparatuses have a simplified configuration.

In the above-described embodiment, as illustrated in FIG. 3, each object tracking apparatus 101 includes the label replacing unit 306 and the label replacement dictionary storage unit 305. In some embodiments, the monitoring apparatus 103 may include the label replacing unit 306 and the label replacement dictionary storage unit 305.

FIG. 16 illustrates an exemplary functional configuration of an image processing system 5000 including a monitoring apparatus 1603 that includes a label replacing unit 1606 and a label replacement dictionary storage unit 1605. In such a configuration, an object tracking apparatus 1601 transmits a tracking result containing a tracking label assigned to an object to the monitoring apparatus 1603, in addition, the label assigning apparatus 1602 transmits a label replacement dictionary to the monitoring apparatus 1603.

In the monitoring apparatus 1603 which has received the tracking result and the label replacement dictionary from the object tracking apparatus 1601, the label replacing unit 1606 can replace the tracking label, contained in the tracking result, with an object label by referring to the label replacement dictionary stored in the label replacement dictionary storage unit 1605. In the system with the above-described configuration, the object tracking apparatus 1601 does not have to replace the tracking label with the object label, thus reducing a calculation load on the object tracking apparatus 1601. For example, if the object tracking apparatus 1601 has limited computing performance, the label replacing unit 1606 may perform a process of replacing the tracking label with the object label in a computer, such as a server, functioning as the monitoring apparatus 1603 and exhibiting excellent computing performance. A tracking result acquiring unit 1604, an object label information updating unit 1607, an object label information storage unit 1608, a label replacement dictionary generating; unit 1609, a camera information storage unit 1610, an object relation calculating unit 1611, and a 3D position storage unit 1612 are equivalent to the tracking result acquiring unit 304, the object label information updating unit 307, the object label information storage unit 308, the label replacement dictionary generating unit 309, the camera information storage unit 310, the object relation calculating unit 311, and the 3D position storage unit 312 in FIG. 3, respectively.

Although the image processing systems with various configurations have been described above, the system may have any configuration, any network configuration, and any functional configuration. The above-described system configurations, network configurations, and functional configurations may be appropriately changed and used in combination.

Although the embodiment of the present invention and the modifications have been described in detail above, all or some of the components of the image processing systems 1000, 2000, 3000, 4000, and 5000 according to the embodiment and the modifications may be included in the computer 2:20 illustrated in FIG. 2. For example, each of the object tracking apparatuses 101, the label assigning apparatus 102, and the monitoring apparatus 103 may be the computer 220 in FIG. 2.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
one or more processors; and
a memory coupled to the one or more processors, the memory having stored thereon instructions which, when executed by the one or more processors, cause the apparatus to:
acquire multiple tracking results about an object tracked in multiple video images captured by multiple imaging devices, the tracking results corresponding one-to-one to the video images, each of the tracking results containing a position of the object detected from an image frame of the corresponding video image and a tracking label that identifies the object in the video image;
relate objects, detected from image frames of the video images, across the video images based on the acquired tracking results to obtain relations; and
generate an object label based on the obtained relations, the object label uniquely identifying the object across the video images.

2. The apparatus according to claim 1, further comprising:
a storage device which stores, as object label information, a relation candidate containing a combination of the tracking labels for the related objects and the object label,
wherein the instructions, when executed by the one or more processors, further cause the apparatus to generate a label conversion dictionary based on the object label information stored in the storage device, the label conversion dictionary containing a set of at least one tracking label and the object label.

3. The apparatus according to claim 2, wherein the instructions, when executed by the one or more processors, further cause the apparatus to generate the label conversion dictionary by selecting a candidate having a high likelihood that the tracking labels in the candidate are related to the object label from the object label information.

4. The apparatus according to claim 2, wherein the instructions, when executed by the one or more processors, further cause the apparatus to calculate similarity between the object label information and a combination of the tracking labels, and to generate the label conversion dictionary based on the similarity.

5. The apparatus according to claim 4, wherein the instructions, when executed by the one or more processors, further cause the apparatus to calculate the similarity based on the number of tracking labels in the object label information matching the tracking labels in the combination.

6. The apparatus according to claim 4, wherein the instructions, when executed by the one or more processors, further cause the apparatus to exclude a tracking label, included in the combination, indicating non-detection of the object in an image frame from targets for calculation of the similarity.

7. The apparatus according to claim 2,
wherein the instructions, when executed by the one or more processors, further cause the apparatus to calculate to output the label conversion dictionary generated by another apparatus.

8. The apparatus according to claim 2,
wherein the instructions, when executed by the one or more processors, further cause the apparatus to update the object label information, stored in the storage device, with the combination of the related tracking labels.

9. The apparatus according to claim 8, wherein the instructions, when executed by the one or more processors, further cause the apparatus to update the object label information for each image frame.

10. The apparatus according to claim 8, wherein the instructions, when executed by the one or more processors, further cause the apparatus to calculate similarities between the object label information and the combination of the tracking labels, to select a candidate having higher similarity from the object label information, and to update tracking labels contained in the selected candidate with the combination of the tracking labels.

11. The apparatus according to claim 1,
wherein the instructions, when executed by the one or more processors, further cause the apparatus to calculate positions of the objects in a 3D space based on the obtained relations.

12. The apparatus according to claim 1,
wherein the instructions, when executed by the one or more processors, further cause the apparatus to eliminate a virtual object image at any of the calculated positions based on the relations obtained from past image frames.

13. The apparatus according to claim 1, wherein the instructions, when executed by the one or more processors, further cause the apparatus to use a position and an orientation of each of the imaging devices and the positions of the objects in the image frames of the video images to generate a combination of the tracking labels for the objects based on the tracking results.

14. The apparatus according to claim 1, further comprising:
an imaging device which captures a video image; and
a communication device which transmits the captured video image to another apparatus via a network.

15. The apparatus according to claim 1, wherein the instructions, when executed by the one or more processors, further cause the apparatus to assign priorities to tracking results about objects detected by more imaging devices and to relate the objects.

16. The apparatus according to claim 1, wherein the instructions, when executed by the one or more processors, further cause the apparatus to relate representative points of regions representing the objects in the image frames using stereo vision based on epipolar geometry to relate the objects.

17. An image processing apparatus comprising:
one or more processors; and
a memory coupled to the one or more processors, the memory having stored thereon instructions which, when executed by the one or more processors, cause the apparatus to:
obtain a detected position of an object tracked in a video image captured by an imaging device and detected from an image frame of the video image, assign the object a tracking label that identifies the object in the video image, and generate a tracking result containing the detected position of the object and the tracking label;
acquire a label conversion dictionary that contains a set of the tracking label assigned to the object and an object label that uniquely identifies the object across multiple video images captured by multiple imaging devices;
replace the tracking label assigned to the object with the object label set in combination with the tracking label based on the label conversion dictionary such that the object label is set in place of the tracking label;
track the object in a series of image frames of the video image using the set object label; and
transmit the tracking result containing the object label set in place of the tracking label to another apparatus.

18. The apparatus according to claim 17, further comprising:
an imaging device which captures a video image; and
a video image transmitting device which transmits the captured video image to another apparatus.

19. An image processing apparatus comprising:
one or more processors; and
a memory coupled to the one or more processors, the memory having stored thereon instructions which, when executed by the one or more processors, cause the apparatus to:
acquire multiple video images captured by multiple imaging devices and multiple tracking results about an object tracked in the video images, the tracking results corresponding one-to-one to the video images, each of the tracking results containing a position of the object in an image frame of the corresponding video image and an object label that uniquely identifies the object across the video images;
input a position of the object in a 3D space, the position being calculated based on the object label; and
allow a display device to display the video images, a 3D map representing the 3D space, and a symbol indicating that objects assigned the same object label are a same object such that the symbol is displayed in a region representing the object in each of the video images and the 3D map.

20. An image processing system comprising:
a label processing apparatus;
an object tracking apparatus; and
an image display apparatus,
the apparatuses being connected by a network,
the label processing apparatus including
one or more processors; and
a memory coupled to the one or more processors, the memory having stored thereon instructions which, when executed by the one or more processors, cause the label processing apparatus to:
acquire multiple tracking results about an object tracked in multiple video images captured by multiple imaging devices, the tracking results corresponding one-to-one to the video images, each of the tracking result containing a position of the object in an image frame of the corresponding video image and a tracking label that identifies the object in the video image,
relate objects, detected from image frames of the video images, based on the acquired tracking results to obtain relations, generate an object label that uniquely identifies the object across the video images based on the obtained relations, store in a storage device, as object label information, a relation candidate containing a combination of the tracking labels for the related objects and the object label, generate a label conversion dictionary based on the object label information stored in the storage device, the label conversion dictionary containing a set of at least one tracking label and the object label, and combine the acquired tracking results based on the object label, and calculate a position of the object in a 3D space, the object tracking apparatus including
one or more processors; and a memory coupled to the one or more processors, the memory having stored thereon instructions which, when executed by the one or more processors, cause the apparatus to:

acquire the label conversion dictionary, replace the tracking label assigned to the object with the object label set in combination with the tracking label based on the label conversion dictionary such that the object label is set in place of the tracking label, and track the object in a series of image frames of the video image using the set object label, the image display apparatus including
one or more processors; and a memory coupled to the one or more processors, the memory having stored thereon instructions which, when executed by the one or more processors, cause the apparatus to:

acquire tracking results each containing the object label set in place of the tracking label together with multiple video images captured by multiple image capturing devices, input a position of the object in the 3D space, and allow a display device to display the video images, a 3D map representing the 3D space, and a symbol indicating that objects assigned the same object label are a same object such that the symbol is displayed in a region representing the object in each of the video images and the 3D map.

21. A method for image processing, the method comprising the steps of:

acquiring multiple tracking results about an object tracked in multiple video images captured by multiple imaging devices, the tracking results corresponding one-to-one to the video images, each of the tracking results containing a position of the object detected from an image frame of the corresponding video image and a tracking label that identifies the object in the video image;

relating objects, detected from image frames of the video images, across the video images based on the acquired tracking results to obtain relations; and generating an object label based on the relations, the object label uniquely identifying the object across the video images.

22. A method for image processing, the method comprising the steps of:

obtaining a detected position of an object tracked in a video image captured by an imaging device and detected from an image frame of the video image, and assigning the object a tracking label that identifies the object in the video image to generate a tracking result containing the detected position of the object and the tracking label;

acquiring a label conversion dictionary that contains a set of the tracking label assigned to the object and an object label that uniquely identifies the object across multiple video images captured by multiple imaging devices;

replacing the tracking label assigned to the object with the object label set in combination with the tracking label based on the label conversion dictionary such that the object label is set in place of the tracking label;

tracking the object in a series of image frames of the video image using the object label set in place of the tracking label; and transmitting the tracking result containing the object label set in place of the tracking label to another apparatus.

23. A method for image processing, the method comprising the steps of:

acquiring multiple video images captured by multiple imaging devices and multiple tracking results about an object tracked in the video images, the tracking results corresponding one-to-one to the video images, each of the tracking results containing a position of the object in an image frame of the corresponding video image and an object label that uniquely identifies the object across the video images;

inputting a position of the object in a 3D space, the position being calculated based on the object label; and allowing a display unit to display the video images, a 3D map representing the 3D space, and a symbol indicating that objects assigned the same object label are a same object such that the symbol is displayed in a region representing the object in each of the video images and the 3D map.

24. A non-transitory computer-readable storage medium storing a computer program that, when executed causes a computer to perform the steps:

acquiring multiple tracking results about an object tracked in multiple video images captured by multiple imaging devices, the tracking results corresponding one-to-one to the video images, each of the tracking results containing a position of the object detected from an image frame of the corresponding video image and a tracking label that identifies the object in the video image;

relating objects, detected from image frames of the video images, across the video images based on the acquired tracking results to obtain relations; and generating an object label based on the relations, the object label uniquely identifying the object across the video images.

25. A non-transitory computer-readable storage medium storing a computer program that, when executed causes a computer to perform the steps of:

obtaining a detected position of an object tracked in a video image captured by an imaging device and detected from an image frame of the video image, and assigning the object a tracking label that identifies the object in the video image to generate a tracking result containing the detected position of the object and the tracking label;

acquiring a label conversion dictionary that contains a set of the tracking label assigned to the object and an object label that uniquely identifies the object across multiple video images captured by multiple imaging devices;

replacing the tracking label assigned to the object with the object label set in combination with the tracking label based on the label conversion dictionary such that the object label is set in place of the tracking label;

tracking the object in a series of image frames of the video image using the object label set in place of the tracking label; and transmitting the tracking result containing the object label set in place of the tracking label to another apparatus.

26. A non-transitory computer-readable storage medium storing a computer program that, when executed causes a computer to perform the steps of:

acquiring multiple video images captured by multiple imaging devices and multiple tracking results about an object tracked in the video images, the tracking results corresponding one-to-one to the video images, each of the tracking results containing a position of the object in an image frame of the corresponding video image and an object label that uniquely identifies the object across the video images;

inputting a position of the object in a 3D space, the position being calculated based on the object label; and allowing a display unit to display the video images, a 3D map representing the 3D space, and a symbol indicating that objects assigned the same object label are a same object such that the symbol is displayed in a region representing the object in each of the video images and the 3D map.

* * * * *